US012112705B2

(12) United States Patent
Kim et al.

(10) Patent No.: US 12,112,705 B2
(45) **Date of Patent: *Oct. 8, 2024**

(54) PIXEL, DISPLAY DEVICE, AND METHOD OF DRIVING DISPLAY DEVICE

(71) Applicant: Samsung Display Co., Ltd., Yongin-si (KR)

(72) Inventors: Hanbit Kim, Seoul (KR); Taewook Kang, Seongnam-si (KR); Doo-Na Kim, Seongnam-si (KR); Sangsub Kim, Suwon-si (KR); Yunjung Oh, Anyang-si (KR); Dokyeong Lee, Yongin-si (KR); Jaehwan Chu, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,160

(22) Filed: Oct. 3, 2023

(65) Prior Publication Data

US 2024/0029655 A1 Jan. 25, 2024

Related U.S. Application Data

(63) Continuation of application No. 17/741,833, filed on May 11, 2022, now Pat. No. 11,810,511.

(30) Foreign Application Priority Data

Aug. 24, 2021 (KR) ........................ 10-2021-0111960

(51) Int. Cl.

| | |
|---|---|
| ***G09G 3/32*** | (2016.01) |
| ***G09G 3/3241*** | (2016.01) |
| ***G09G 3/3291*** | (2016.01) |

(52) U.S. Cl.
CPC ......... *G09G 3/3241* (2013.01); *G09G 3/3291* (2013.01); *G09G 2300/0426* (2013.01);
(Continued)

(58) Field of Classification Search
CPC ............... G09G 3/3241; G09G 3/3291; G09G 2300/0426; G09G 2300/0842; G09G 2310/027; G09G 2330/021
See application file for complete search history.

(56) References Cited

U.S. PATENT DOCUMENTS

| | | | | |
|---|---|---|---|---|
| 10,878,752 | B1 | 12/2020 | Li et al. | |
| 2018/0130410 | A1* | 5/2018 | Gao ..................... | G09G 3/3225 |
| 2022/0375408 | A1* | 11/2022 | Dong ................... | G09G 3/3241 |

FOREIGN PATENT DOCUMENTS

| | | | |
|---|---|---|---|
| KR | 1020120069137 | A | 6/2012 |
| KR | 1020120074422 | A | 7/2012 |

(Continued)

*Primary Examiner* — Michael A Faragalla
(74) *Attorney, Agent, or Firm* — CANTOR COLBURN LLP

(57) ABSTRACT

A pixel includes an organic light-emitting diode, a driving transistor, a first dual gate transistor, a first capacitor, and a compensation transistor. The organic light-emitting diode includes first and second terminals. The driving transistor generates the driving current and includes a first terminal to which a first power supply voltage is applied, a second terminal connected to the first terminal of the organic light-emitting diode, and a gate terminal. The first dual gate transistor is connected between the gate terminal of the driving transistor and the second terminal of the driving transistor and includes first and second sub-transistors. The first capacitor includes a first electrode to which the first power supply voltage is applied, and a second electrode connected to a first node that connects the first and second (Continued)

sub-transistors to each other. The compensation transistor includes a terminal connected between the second electrode and the first node.

20 Claims, 11 Drawing Sheets

(52) U.S. Cl.
CPC .............. *G09G 2300/0842* (2013.01); *G09G 2310/027* (2013.01); *G09G 2330/021* (2013.01)

(56) References Cited

FOREIGN PATENT DOCUMENTS

| | | | |
|---|---|---|---|
| KR | 101817597 | B1 | 1/2018 |
| KR | 1020200015862 | A | 2/2020 |

* cited by examiner

PIXEL, DISPLAY DEVICE, AND METHOD OF DRIVING DISPLAY DEVICE

This application is a continuation of U.S. patent application Ser. No. 17/741,833, filed on May 11, 2022, which claims priority to Korean Patent Application No. 10-2021-0111960, filed on Aug. 24, 2021, and all the benefits accruing therefrom under 35 U.S.C. § 119, the content of which in its entirety is herein incorporated by reference.

BACKGROUND

1. Field

Embodiments relate generally to a pixel, a display device, and a method of driving display device. More particularly, embodiments of the invention relate to a pixel, a display device including the pixel, and a method of driving display device including the pixel.

2. Description of the Related Art

Flat panel display devices are used as display devices for replacing a cathode ray tube display device due to advantages of the flat panel display devices such as lightweight and thin characteristics. The flat panel display devices include a liquid crystal display device, an organic light-emitting diode display device, a quantum dot display device, and the like, for example.

In order to increase efficiency of a battery included in the organic light-emitting diode display device or the quantum dot display device, it is desired to reduce power consumption of pixels included in the display device. Recently, in order to reduce the power consumption of the pixels, a low-frequency driving technology for reducing a driving frequency for driving the pixels when the pixels display a still image is being developed.

SUMMARY

While pixels display an image based on data voltages, the data voltages may be distorted by leakage currents or the like of transistors included in the pixels, and image quality of the display device may deteriorate.

Embodiments provide a pixel.

Embodiments provide a display device including a pixel.

Embodiments provide a method of driving a display device including a pixel.

In an embodiment of the invention, a pixel includes an organic light-emitting diode, a driving transistor, a first dual gate transistor, a first capacitor, and a compensation transistor. The organic light-emitting diode outputs a light based on a driving current, and includes a first terminal and a second terminal. The driving transistor generates the driving current, and includes a first terminal to which a first power supply voltage is applied, a second terminal electrically connected to the first terminal of the organic light-emitting diode, and a gate terminal to which an initialization voltage is applied. The first dual gate transistor is connected between the gate terminal of the driving transistor and the second terminal of the driving transistor, and includes a first sub-transistor and a second sub-transistor, which are connected in series. The first capacitor includes a first electrode to which the first power supply voltage is applied and a second electrode connected to a first node that connects the first and second sub-transistors to each other. The compensation transistor includes a first terminal to which a compensation voltage is applied, a second terminal connected between the second electrode and the first node, and a gate terminal to which a compensation gate signal is applied.

In an embodiment, a voltage level of the compensation voltage may be variable according to a gray level.

In an embodiment, the pixel may further include a second dual gate transistor connected between the first sub-transistor and an initialization voltage line to which the initialization voltage is provided, and may include a third sub-transistor and a fourth sub-transistor, which are connected in series.

In an embodiment, the pixel may further include a second capacitor including a third electrode to which the first power supply voltage is applied and a fourth electrode connected to a second node that connects the third and fourth sub-transistors to each other.

In an embodiment, the second terminal of the compensation transistor may be additionally connected between the fourth electrode and the second node, and may provide the compensation voltage, which has a voltage level that is variable according to a gray level, to the first node and the second node.

In an embodiment, when the pixel is driven at a first frequency, the compensation transistor may provide the compensation voltage to the first and second nodes in response to the compensation gate signal, and the compensation transistor may reduce a deviation between a leakage current at the first node and a leakage current at the second node.

In an embodiment, when the pixel is driven at a second frequency different from the first frequency, the compensation transistor may be turned off.

In an embodiment, the first frequency may be greater than about 0 hertz (Hz) and less than about 60 Hz, and the second frequency may be greater than or equal to about 60 Hz, and less than or equal to about 240 Hz.

In an embodiment, the first dual gate transistor may diode-connect the driving transistor in response to a gate signal.

In an embodiment, the pixel may further include a storage capacitor and a first switching transistor. The storage capacitor may include a first terminal to which the first power supply voltage is applied and a second terminal connected to the gate terminal of the driving transistor. The first switching transistor may include a first terminal connected to the first terminal of the driving transistor, a second terminal to which a data voltage is applied, and a gate terminal to which a gate signal is applied.

In an embodiment, the pixel may include a second switching transistor and a third switching transistor. The second switching transistor may include a first terminal connected to a first power supply voltage line to which the first power supply voltage is provided, a second terminal connected to the first terminal of the driving transistor, and a gate terminal to which an emission signal is applied. The third switching transistor may include a first terminal connected to the second terminal of the driving transistor, a second terminal connected to the first terminal of the organic light-emitting diode, and a gate terminal to which the emission signal is applied.

In an embodiment, the pixel may further include a fourth switching transistor including a first terminal to which the initialization voltage is applied, a second terminal connected to the first terminal of the organic light-emitting diode, and a gate electrode to which an anode initialization signal is applied.

In an embodiment of the invention, a display device includes a display panel, a data driver, and a compensation driver. A pixel of the pixels includes an organic light-emitting diode, a driving transistor, a first dual gate transistor, a first capacitor, and a compensation transistor.

The organic light-emitting diode outputs a light based on a driving current, and includes a first terminal and a second terminal. The driving transistor generates the driving current, and includes a first terminal to which a first power supply voltage is applied, a second terminal electrically connected to the first terminal of the organic light-emitting diode, and a gate terminal to which an initialization voltage is applied. The first dual gate transistor is connected between the gate terminal of the driving transistor and the second terminal of the driving transistor, and includes a first sub-transistor and a second sub-transistor, which are connected in series. The first capacitor includes a first electrode to which the first power supply voltage is applied and a second electrode connected to a first node that connects the first and second sub-transistors to each other. The compensation transistor includes a first terminal to which a compensation voltage is applied, a second terminal connected between the second electrode and the first node, and a gate terminal to which a compensation gate signal is applied. The data driver generates a data voltage corresponding to input image data and supplies the data voltage to the pixels. The compensation driver receives gray level data from the data driver and generates the compensation voltage.

In an embodiment, the pixel may further include a second dual gate transistor and a second capacitor. The second dual gate transistor may be connected between the first sub-transistor and an initialization voltage line to which the initialization voltage is provided, and may include a third sub-transistor and a fourth sub-transistor, which are connected in series. The second capacitor may include a third electrode to which the first power supply voltage is applied and a fourth electrode connected to a second node that connects the third and fourth sub-transistors to each other. The second terminal of the compensation transistor may be additionally connected between the fourth electrode and the second node.

In an embodiment, the compensation driver may provide the compensation gate signal and the compensation voltage to the compensation transistor when the pixel is driven at a first frequency.

In an embodiment, the compensation driver may include a memory, a calculator, and a signal generator. The memory may store compensation voltage data for reducing a deviation between a leakage current at the first node and a leakage current at the second node according to a gray level. The calculator may receive the gray level data, and may determine the compensation voltage corresponding to the gray level among the compensation voltage data. The signal generator may generate the compensation voltage and the compensation gate signal.

In an embodiment, the pixel may further include a storage capacitor, a first switching transistor, a second switching transistor, a third switching transistor, and a fourth switching transistor. The storage capacitor may include a first terminal to which the first power supply voltage is applied and a second terminal connected to the gate terminal of the driving transistor. The first switching transistor may include a first terminal connected to the first terminal of the driving transistor, a second terminal to which the data voltage is applied, and a gate terminal to which a gate signal is applied. The second switching transistor may include a first terminal connected to a first power supply voltage line to which the first power supply voltage is provided, a second terminal connected to the first terminal of the driving transistor, and a gate terminal to which an emission signal is applied. The third switching transistor may include a first terminal connected to the second terminal of the driving transistor, a second terminal connected to the first terminal of the organic light-emitting diode, and a gate terminal to which the emission signal is applied. The fourth switching transistor may include a first terminal to which the initialization voltage is applied, a second terminal connected to the first terminal of the organic light-emitting diode, and a gate electrode to which an anode initialization signal is applied.

In an embodiment, the display device may further include a gate driver which generates a gate signal to supply the gate signal to the pixels, an emission driver which generates an emission signal to supply the emission signal to the pixels, a power supply unit which generates the first power supply voltage, the initialization voltage, and a second power supply voltage to provide the first power supply voltage, the initialization voltage, and the second power supply voltage to the pixels, and a controller which generates the input image data to provide the input image data to the data driver.

In an embodiment, a method of manufacturing a display device is provided as follows. Gray level data is received from a data driver. A compensation voltage that is variable according to a gray level of the gray level data among compensation voltage data stored in a memory is determined to reduce a voltage across opposite ends of each of first and second dual gate transistors. A compensation gate signal and the compensation voltage are generated. The compensation gate signal and the compensation voltage are provided to a pixel.

In an embodiment, before the receiving the gray level data from the data driver, the method may further include receiving driving frequency data from a controller and determining whether a driving frequency corresponds to first-frequency driving or second-frequency driving. When the driving frequency is a first frequency, the gray level data may be received from the data driver. When the driving frequency is a second frequency different from the first frequency, the gray level data may not be received from the data driver.

Since the display device in the embodiments of the invention includes the compensation driver including the memory which stores the compensation voltage data corresponding to all gray levels, the calculator which determines the compensation voltage corresponding to the gray level data among the compensation voltage data, and the signal generator which generates the compensation gate signal and the compensation voltage, the first and second capacitors, and the eighth transistor to which the compensation gate signal and the compensation voltage are applied, the difference of the voltage across the opposite ends of each of the third and fourth transistors may be reduced in all gray levels, and the deviation between the first leakage current and the second leakage current may also be reduced. Accordingly, the flicker phenomenon that may occur in the display device may be significantly reduced.

The method of driving the display device in embodiments of the invention may be performed only in the low-frequency driving, a difference of a voltage across opposite ends of each of third and fourth transistors may be reduced in all gray levels, and a deviation between a first leakage current and a second leakage current may also be reduced. Accordingly, the flicker phenomenon that may occur in the display device may be significantly reduced.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
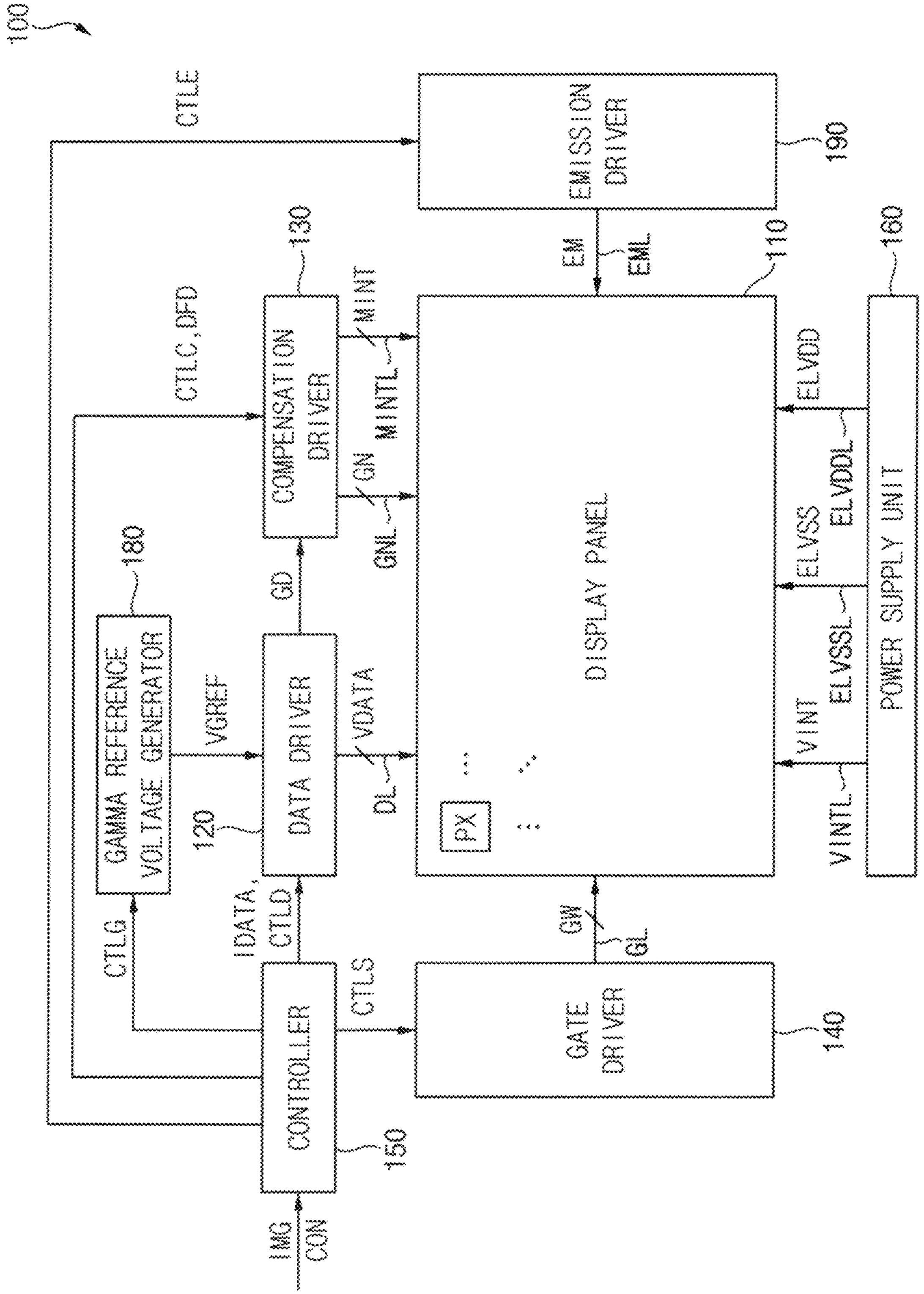
FIG. 1 is a block diagram showing an embodiment of a display device according to the invention.

Hereinafter, a pixel, display devices, and a method of driving display device in embodiments of the invention will be described in detail with reference to the accompanying drawings. In the accompanying drawings, same or similar reference numerals refer to the same or similar elements.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Figure 2:
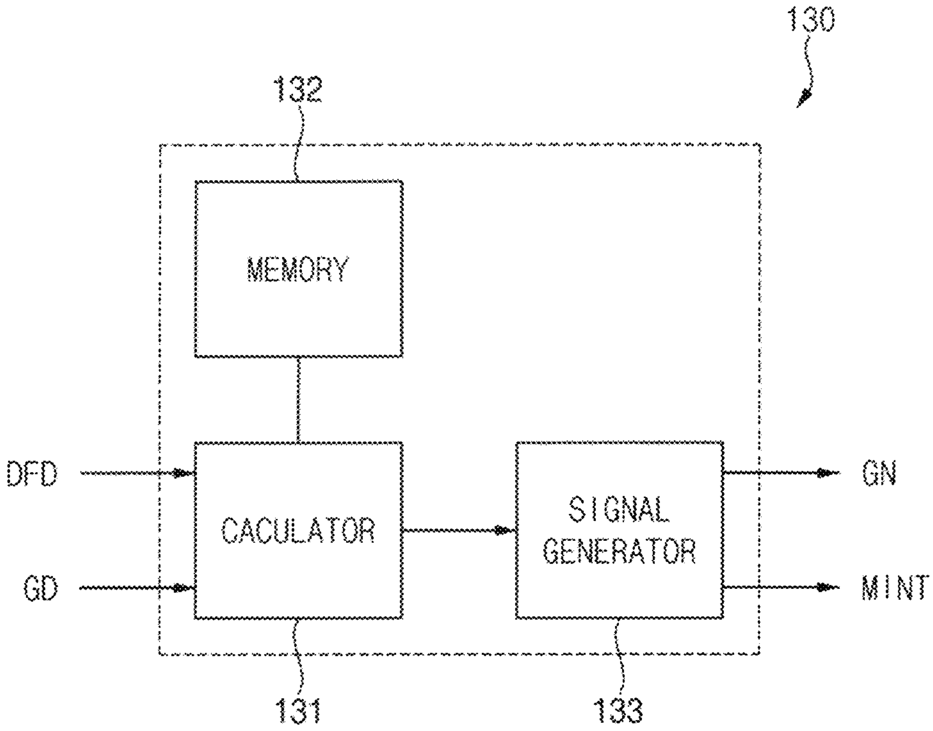
FIG. 2 is a block diagram showing a compensation driver included in the display device of FIG. 1.

FIG. 1 is a block diagram showing an embodiment of a display device according to the invention, and FIG. 2 is a block diagram showing a compensation driver included in the display device of FIG. 1.

Referring to FIGS. 1 and 2, a display device 100 may include a display panel 110 including a plurality of pixels PX, a controller 150, a data driver 120, a gate driver 140, an emission driver 190, a power supply unit 160, a gamma reference voltage generator 180, a compensation driver 130 or the like. In this case, the compensation driver 130 may include a calculator 131, a memory 132, and a signal generator 133.

The display panel 110 may include a plurality of data lines DL, a plurality of gate lines GL, a plurality of emission lines EML, a plurality of first power supply voltage lines ELVDDL, a plurality of second power supply voltage lines ELVSSL, a plurality of initialization voltage lines VINTL, compensation gate lines GNL, compensation voltage lines MINTL, and a plurality of pixels PX connected to the lines.

In an embodiment, each of the pixels PX may include at least two transistors, at least one capacitor, and a light-emitting element, and the display panel 110 may be a light-emitting display panel. In other embodiments, the display panel 110 may include a display panel of a quantum dot display device ("QDD"), a display panel of a liquid crystal display device ("LCD"), a display panel of a field emission display device ("FED"), a display panel of a plasma display device ("PDP"), or a display panel of an electrophoretic display device ("EPD").

The controller 150 (e.g., a timing controller ("T-CON")) may receive image data IMG and an input control signal CON from an external host processor (e.g., an application processor ("AP"), a graphic processing unit ("GPU"), or a graphic card). The image data IMG may be RGB image data including red image data, green image data, and blue image data. In addition, the image data IMG may include information on a driving frequency. The control signal CON may include a vertical synchronization signal, a horizontal synchronization signal, an input data enable signal, a master clock signal, or the like, but the invention is not limited thereto.

The controller 150 may convert the image data IMG into input image data IDATA by applying an algorithm (e.g., dynamic capacitance compensation ("DCC"), etc.) for correcting image quality to the image data IMG supplied from the external host processor. In some embodiments, when the controller 150 does not include an algorithm for improving image quality, the image data IMG may be output as the input image data IDATA. The controller 150 may supply the input image data IDATA to the data driver 120.

The controller 150 may generate a data control signal CTLD for controlling driving of the input image data IDATA, a gate control signal CTLS for controlling an operation of the gate driver 140, an emission control signal CTLE for controlling an operation of the emission driver 190, a gamma control signal CTLG for controlling an operation of the gamma reference voltage generator 180, and a compensation control signal CTLC for controlling an operation of the compensation driver 130 based on the input control signal CON. In an embodiment, the gate control signal CTLS may include a vertical start signal, scan clock signals, or the like, and the data control signal CTLD may include a horizontal start signal, a data clock signal, or the like, for example. In an embodiment, the controller 150 may provide driving frequency data DFD including the information on the driving frequency to the compensation driver 130.

The gate driver 140 may generate gate signals GW based on the gate control signal CTLS received from the controller 150. The gate driver 140 may output the gate signals GW to the pixels PX connected to the gate lines GL. In addition, the gate driver 140 may additionally generate a gate initialization signal GI (refer to FIG. 3) and an anode initialization signal GB (refer to FIG. 3) to output the generated gate initialization signal GI and the generated anode initialization signal GB to the pixels PX.

The emission driver 190 may generate emission signals EM based on the emission control signal CTLE received from the controller 150. The emission driver 190 may output the emission signals EM to the pixels PX connected to the emission lines EML.

The power supply unit 160 may generate an initialization voltage VINT, a first power supply voltage ELVDD, and a second power supply voltage ELVSS, and provide the initialization voltage VINT, the first power supply voltage ELVDD, and the second power supply voltage ELVSS to the pixels PX through the initialization voltage line VINTL, the first power supply voltage line ELVDDL, and the second power supply voltage line ELVSSL.

The gamma reference voltage generator 180 may generate a gamma reference voltage VGREF based on the gamma control signal CTLG received from the controller 150. The gamma reference voltage generator 180 may provide the gamma reference voltage VGREF to the data driver 120. The gamma reference voltage VGREF provided to the data driver 120 may have a value corresponding to each input image data IDATA. In some embodiments, the gamma reference voltage generator 180 may be unitary with the data driver 120 or the controller 150.

The data driver 120 may receive the data control signal CTLD and the input image data IDATA from the controller 150, and receive the gamma reference voltage VGREF from the gamma reference voltage generator 180. The data driver 120 may convert digital input image data IDATA into an analog data voltage by the gamma reference voltage VGREF. In this case, the analog data voltage obtained by the conversion will be defined as a data voltage VDATA. The data driver 120 may output data voltages VDATA to the pixels PX connected to the data lines DL based on the data control signal CTLD. In other embodiments, the data driver 120 and the controller 150 may be implemented as a single integrated circuit ("IC"), and such an IC may be also referred to as a timing controller-embedded data driver ("TED"). In an embodiment, the data voltage VDATA may include information on a gray level, and the data driver 120 may provide gray level data GD including the information on the gray level to the compensation driver 130.

In an embodiment, a correlation between a luminance of the display device 100 and the gray level data GD may be defined according to a gamma curve, for example. In order for the display device 100 to maintain stable display quality, it may be desired to perform gamma setting very accurately. When an error occurs in the gamma setting, a deviation between an actual luminance and a luminance according to the gray level data GD may occur. In order to minimize such a deviation, multi-time programming ("MTP") for programming the gamma reference voltage VGREF in real time may be performed. The gamma reference voltage VGREF may refer to a voltage input to the data driver 120, which generates the data voltage VDATA for determining a luminance. According to the gray level data GD, the data driver 120 may generate the data voltage VDATA by the gamma reference voltage VGREF, and the pixel PX may emit a light according to the data voltage VDATA. In other words, the gray level data GD may be obtained in a process of performing the multi-time programming.

The compensation driver 130 may receive the compensation control signal CTLC and the driving frequency data DFD from the controller 150, and the compensation driver 130 may receive the gray level data GD from the data driver 120.

As shown in FIG. 2, the driving frequency data DFD may be provided to the calculator 131. The calculator 131 may determine whether the driving frequency data DFD corresponds to high-frequency driving or low-frequency driving. In an embodiment, a low frequency may be a frequency that is greater than about 0 hertz (Hz) and less than about 60 Hz, for example. In addition, a high frequency may be greater than or equal to about 60 Hz, and less than or equal to about 240 Hz. However, the above frequency range is one embodiment, and the high frequency and the low frequency according to the invention are not limited to the above frequency range.

In an embodiment, when the calculator 131 determines that the driving frequency data DFD corresponds to the low-frequency driving (e.g., first-frequency driving), the gray level data GD may be provided to the calculator 131. On the contrary, when the calculator 131 determines that the driving frequency data DFD corresponds to the high-frequency driving (e.g., second-frequency driving), the gray level data GD may not be provided to the calculator 131, and the calculator 131 may not be driven.

When the gray level data GD is provided to the calculator 131, the calculator 131 may determine a compensation voltage corresponding to the gray level data GD among compensation voltage data stored in the memory 132. In an embodiment, the compensation voltage data corresponding to all gray levels (e.g., 0 to 255 gray levels) may be stored in the memory 132, for example. The compensation voltage will be described in detail below.

The signal generator 133 may generate a compensation voltage MINT based on the compensation voltage corresponding to the gray level data GD, and the signal generator 133 may generate a compensation gate signal GN.

The compensation driver 130 may output the compensation gate signal GN and the compensation voltage MINT to the pixels PX connected to the compensation gate lines GNL and the compensation voltage lines MINTL based on the compensation control signal CTLC. In some embodiments, the compensation driver 130 may be unitary with the data driver 120 or the controller 150.

Figure 3:
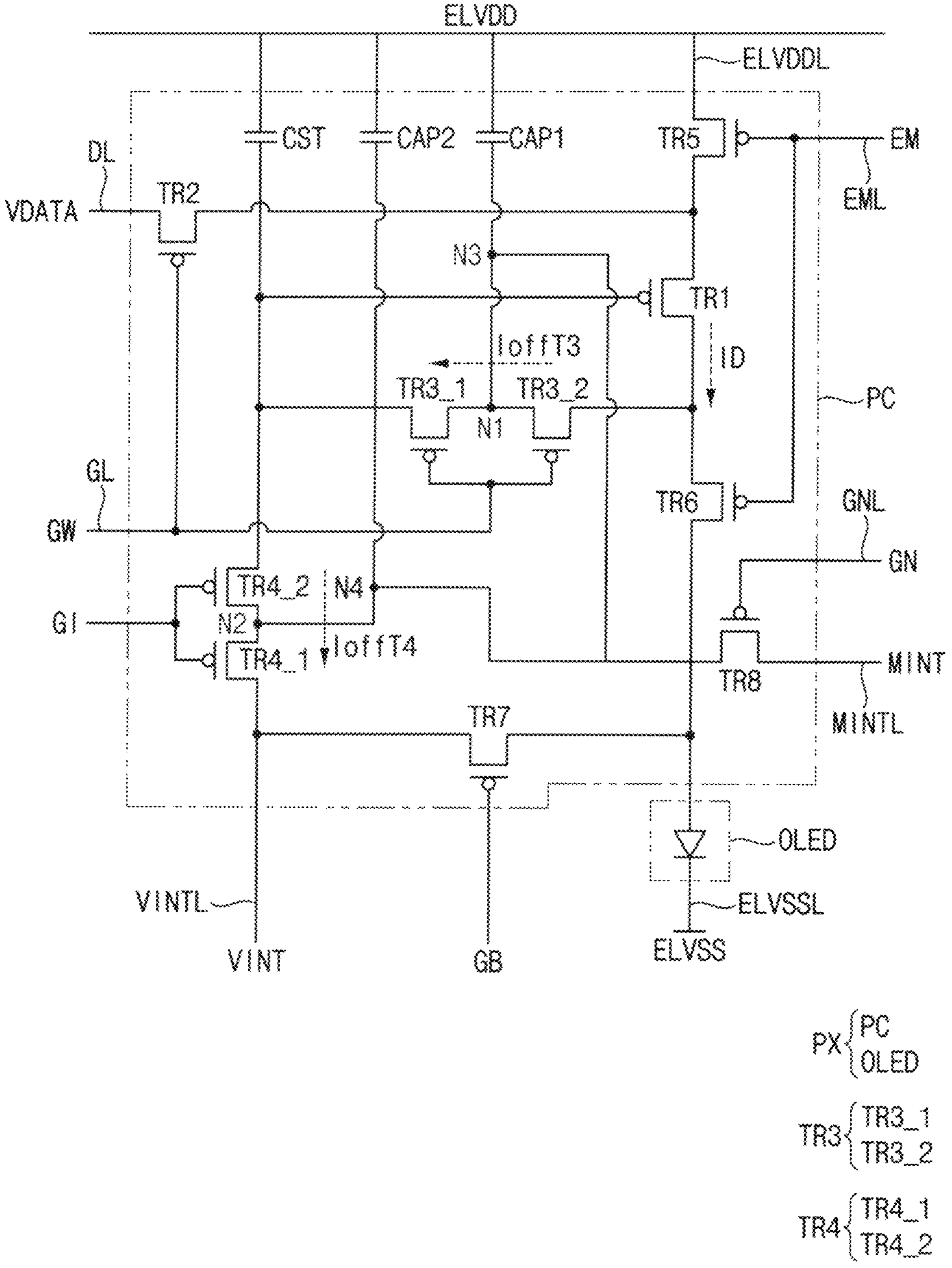
FIG. 3 is a circuit diagram showing a pixel included in FIG. 1.

FIG. 3 is a circuit diagram showing a pixel included in FIG. 1.

Referring to FIG. 3, the display device 100 may include a pixel PX, and the pixel PX may include a pixel circuit PC and an organic light-emitting diode OLED. In this case, the pixel circuit PC may include first to eighth transistors TR1, TR2, TR3, TR4, TR5, TR6, TR7, and TR8, a storage capacitor CST, a first capacitor CAP1, a second capacitor CAP2, or the like. In addition, the pixel circuit PC or the organic light-emitting diode OLED may be connected to the first power supply voltage line ELVDDL, the second power supply voltage line ELVSSL, the initialization voltage line VINTL, the data line DL, the gate line GL, the emission line EML, the compensation gate lines GNL, the compensation voltage lines MINTL, or the like. The first transistor TR1 may correspond to a driving transistor, and the second to eighth transistors TR2, TR3, TR4, TR5, TR6, TR7, and TR8 may correspond to switching transistors. Each of the first to eighth transistors TR1, TR2, TR3, TR4, TR5, TR6, TR7, and TR8 may include a first terminal, a second terminal, and a gate terminal. In an embodiment, the first terminal may be a source terminal, and the second terminal may be a drain terminal. In some embodiments, the first terminal may be a drain terminal, and the second terminal may be a source terminal.

The organic light-emitting diode OLED may output a light based on a driving current ID. The organic light-emitting diode OLED may include a first terminal and a second terminal. In an embodiment, the second terminal of the organic light-emitting diode OLED may receive the second power supply voltage ELVSS, and the first terminal of the organic light-emitting diode OLED may receive the first power supply voltage ELVDD. In an embodiment, the first terminal of the organic light-emitting diode OLED may be an anode terminal, and the second terminal of the organic light-emitting diode OLED may be a cathode terminal, for example. In some embodiments, the first terminal of the organic light-emitting diode OLED may be a cathode terminal, and the second terminal of the organic light-emitting diode OLED may be an anode terminal.

The first power supply voltage ELVDD may be applied to the first terminal of the first transistor TR1, the second terminal of the first transistor TR1 may be connected to the first terminal of the organic light-emitting diode OLED, and the initialization voltage VINT may be applied to the gate terminal of the first transistor TR1.

The first transistor TR1 may generate the driving current ID. In an embodiment, the first transistor TR1 may operate in a saturation region. In this case, the first transistor TR1 may generate the driving current ID based on a voltage difference between the gate terminal and the source terminal of the first transistor TR1. In addition, gray levels may be expressed based on a magnitude of the driving current ID supplied to the organic light-emitting diode OLED. In some embodiments, the first transistor TR1 may operate in a linear region. In this case, the gray levels may be expressed based on the sum of a time during which the driving current is supplied to the organic light-emitting diode OLED within one frame.

The gate terminal of the second transistor TR2 (e.g., a first switching transistor) may receive the gate signal GW. In this case, the gate signal GW may be provided from the gate driver 140 through the gate line GL. The first terminal of the second transistor TR2 may receive the data voltage VDATA. In this case, the data voltage VDATA may be provided from the data driver 120 (refer to FIG. 1) through the data line DL. The second terminal of the second transistor TR2 may be connected to the first terminal of the first transistor TR1. The second transistor TR2 may supply the data voltage VDATA to the first terminal of the first transistor TR1 during an activation period of the gate signal GW. In this case, the second transistor TR2 may operate in a linear region.

The gate terminal of the third transistor TR3 may receive the gate signal GW. The first terminal of the third transistor TR3 may be connected to the gate terminal of the first transistor TR1. The second terminal of the third transistor TR3 may be connected to the second terminal of the first transistor TR1. In other words, the third transistor TR3 may be connected between the gate terminal of the first transistor TR1 and the second terminal of the first transistor TR1.

The third transistor TR3 may connect the gate terminal of the first transistor TR1 to the second terminal of the first transistor TR1 during the activation period of the gate signal GW. In this case, the third transistor TR3 may operate in a linear region. That is, the third transistor TR3 may diode-connect the first transistor TR1 during the activation period of the gate signal GW. In other words, the third transistor TR3 may diode-connect the first transistor TR1 in response to the gate signal GW. Since the first transistor TR1 is diode-connected, a voltage difference corresponding to a threshold voltage of the first transistor TR1 may occur between the first terminal of the first transistor TR1 and the gate terminal of the first transistor TR1. As a result, a voltage obtained by summing up the data voltage VDATA supplied to the first terminal of the first transistor TR1 and the voltage difference (i.e., the threshold voltage) may be supplied to the gate terminal of the first transistor TR1 during the activation period of the gate signal GW. In other words, the data voltage VDATA may be compensated for by the threshold voltage of the first transistor TR1, and the compensated data voltage VDATA may be supplied to the gate terminal of the first transistor TR1.

In an embodiment, the third transistor TR3 may be defined as a first dual gate transistor (or a double gate transistor, a dual gate transistor, etc.). The first dual gate transistor may include a first sub-transistor TR3_1 and a second sub-transistor TR3_2. The first sub-transistor TR3_1 and the second sub-transistor TR3_2 may be connected in series, and a first node N1 may connect the first sub-transistor TR3_1 and the second sub-transistor TR3_2 to each other. In other words, the third transistor TR3 may operate as a dual gate transistor, and the same signal may be applied to a gate terminal of each of the first and second sub-transistors TR3_1 and TR3_2. That is, the gate electrode of each of the first and second sub-transistors TR3_1 and TR3_2 may receive the gate signal GW. In addition, a second terminal of the first sub-transistor TR3_1 and a first terminal of the second sub-transistor TR3_2 may be connected to each other.

The gate terminal of the fourth transistor TR4 may receive the gate initialization signal GI. The first terminal of the fourth transistor TR4 may receive the initialization voltage VINT. The second terminal of the fourth transistor TR4 may be connected to the gate terminal of the first transistor TR1. In other words, the fourth transistor TR4 may be connected between the first sub-transistor TR3_1 and the initialization voltage line VINTL.

The fourth transistor TR4 may supply the initialization voltage VINT to the gate terminal of the first transistor TR1 during an activation period of the gate initialization signal GI. In this case, the fourth transistor TR4 may operate in a linear region. In other words, the fourth transistor TR4 may initialize the gate terminal of the first transistor TR1 to the initialization voltage VINT during the activation period of the gate initialization signal GI. In an embodiment, the initialization voltage VINT may have a voltage level that is sufficiently lower than a voltage level of the data voltage VDATA maintained by the storage capacitor CST in a previous frame, and the initialization voltage VINT may be supplied to the gate terminal of the first transistor TR1. In other embodiments, the initialization voltage may have a voltage level that is sufficiently higher than the voltage level of the data voltage maintained by the storage capacitor in the previous frame, and the initialization voltage may be applied to the gate terminal of the first transistor. In an embodiment, the gate initialization signal GI at a predetermined time point may be substantially the same as a gate signal GW at a time point which precedes the predetermined time point by one horizontal time. In an embodiment, the gate initialization signal GI supplied to pixels PX in an $n^{th}$ row (where n is an integer that is greater than or equal to 2) among a plurality of pixels PX included in the display device 100 may be a signal that is substantially the same as a gate signal GW supplied to pixels PX in an $(n-1)^{th}$ row among the pixels PX, for example. In other words, an activated gate signal GW may be supplied to the pixels PX in the $(n-1)^{th}$ row among the pixels PX, so that an activated gate initialization signal GI may be supplied to the pixels PX in the $n^{th}$ row among the pixels PX. As a result, the data voltage VDATA may be supplied to the pixels PX in the $(n-1)^{th}$ row among the pixels PX, and simultaneously, the gate terminal of the first transistor TR1 included in the pixels PX in the $n^{th}$ row among the pixels PX may be initialized to the initialization voltage VINT.

In an embodiment, the fourth transistor TR4 may be defined as a second dual gate transistor (or a double gate transistor, a dual gate transistor, etc.). The second dual gate transistor may include a third sub-transistor TR4_1 and a fourth sub-transistor TR4_2. The third sub-transistor TR4_1 and the fourth sub-transistor TR4_2 may be connected in series, and a second node N2 may connect the third sub-transistor TR4_1 and the fourth sub-transistor TR4_2 to each other. In other words, the fourth transistor TR4 may operate as a dual gate transistor, and the same signal may be applied to a gate terminal of each of the third and fourth sub-transistors TR4_1 and TR4_2. That is, the gate electrode of each of the third and fourth sub-transistors TR4_1 and TR4_2 may receive the gate initialization signal GI. In addition, a second terminal of the third sub-transistor TR4_1 and a first terminal of the fourth sub-transistor TR4_2 may be connected to each other.

The gate terminal of the fifth transistor TR5 (e.g., a second switching transistor) may receive the emission signal EM. In this case, the emission signal EM may be provided from the emission driver 190 (refer to FIG. 1) through the emission line EML. The first terminal of the fifth transistor TR5 may receive the first power supply voltage ELVDD. The second terminal of the fifth transistor TR5 may be connected to the first terminal of the first transistor TR1. The fifth transistor TR5 may supply the first power supply voltage ELVDD to the first terminal of the first transistor TR1 during an activation period of the emission signal EM. On the contrary, the fifth transistor TR5 may cut off the supply of the first power supply voltage ELVDD during an inactivation period of the emission signal EM. In this case, the fifth transistor TR5 may operate in a linear region. Since the fifth transistor TR5 supplies the first power supply voltage ELVDD to the first terminal of the first transistor TR1 during the activation period of the emission signal EM, the first transistor TR1 may generate the driving current ID. In addition, since the fifth transistor TR5 cuts off the supply of the first power supply voltage ELVDD during the inactivation period of the emission signal EM, the data voltage VDATA supplied to the first terminal of the first transistor TR1 may be supplied to the gate terminal of the first transistor TR1.

The gate terminal of the sixth transistor TR6 (e.g., a third switching transistor) may receive the emission signal EM. The first terminal of the sixth transistor TR6 may be connected to the second terminal of the first transistor TR1. The second terminal of the sixth transistor TR6 may be connected to the first terminal of the organic light-emitting diode OLED. The sixth transistor TR6 may supply the driving current ID generated by the first transistor TR1 to the organic light-emitting diode OLED during the activation period of the emission signal EM. In this case, the sixth transistor TR6 may operate in a linear region. In other words, since the sixth transistor TR6 supplies the driving current ID generated by the first transistor TR1 to the organic light-emitting diode OLED during the activation period of the emission signal EM, the organic light-emitting diode OLED may output the light. In addition, since the sixth transistor TR6 electrically separates the first transistor TR1 and the organic light-emitting diode OLED from each other during the inactivation period of the emission signal EM, the data voltage VDATA supplied to the second terminal of the first transistor TR1 (e.g., a data voltage that has been subject to threshold voltage compensation) may be supplied to the gate terminal of the first transistor TR1.

The gate terminal of the seventh transistor TR7 (e.g., a fourth switching transistor) may receive the anode initialization signal GB. The first terminal of the seventh transistor TR7 may receive the initialization voltage VINT. The second terminal of the seventh transistor TR7 may be connected to the first terminal of the organic light-emitting diode OLED. The seventh transistor TR7 may supply the initialization voltage VINT to the first terminal of the organic light-emitting diode OLED during an activation period of the anode initialization signal GB. In this case, the seventh transistor TR7 may operate in a linear region. In other words, the seventh transistor TR7 may initialize the first terminal of the organic light-emitting diode OLED to the initialization voltage VINT during the activation period of the anode initialization signal GB. In some embodiments, the gate initialization signal GI and the anode initialization signal GB may be substantially the same signal. An operation of initializing the gate terminal of the first transistor TR1 and an operation of initializing the first terminal of the organic light-emitting diode OLED may not affect each other. In other words, the operation of initializing the gate terminal of the first transistor TR1 and the operation of initializing the first terminal of the organic light-emitting diode OLED may be independent of each other.

The storage capacitor CST may be connected between the first power supply voltage line ELVDDL and the gate terminal of the first transistor TR1. The storage capacitor CST may include a first terminal and a second terminal. In an embodiment, the first terminal of the storage capacitor CST may receive the first power supply voltage ELVDD, and the second terminal of the storage capacitor CST may be connected to the gate terminal of the first transistor TR1, for example. The storage capacitor CST may maintain a voltage level of the gate terminal of the first transistor TR1 during an inactivation period of the gate signal GW. The inactivation period of the gate signal GW may include the activation period of the emission signal EM, and the driving current ID generated by the first transistor TR1 may be supplied to the organic light-emitting diode OLED during the activation period of the emission signal EM. Therefore, the driving current ID generated by the first transistor TR1 may be supplied to the organic light-emitting diode OLED based on the voltage level maintained by the storage capacitor CST.

The first capacitor CAP1 may include a first electrode and a second electrode. The first capacitor CAP1 may be connected to the first power supply voltage line ELVDDL and the first node N1. In an embodiment, the first power supply voltage ELVDD may be applied to the first electrode of the first capacitor CAP1, and the second electrode of the first capacitor CAP1 may be connected between the first and second sub-transistors TR3_1 and TR3_2, for example.

The second capacitor CAP2 may include a third electrode and a fourth electrode. The second capacitor CAP2 may be connected to the first power supply voltage line ELVDDL and the second node N2. In an embodiment, the first power supply voltage ELVDD may be applied to the third electrode of the second capacitor CAP2, and the fourth electrode of the second capacitor CAP2 may be connected between the third and fourth sub-transistors TR4_1 and TR4_2, for example.

In an embodiment, the gate line GL, a line to which the gate initialization signal GI is applied, the data line DL, or the like may be disposed at peripheries of the first node N1 and the second node N2, and voltages of the first node N1 and the second node N2 may fluctuate due to a voltage variation of the gate line GL, the line to which the gate initialization signal GI is applied, or the data line DL, for example. In an embodiment, since the first node N1 and the first capacitor CAP1 are connected to each other, the voltage fluctuation of the first node N1 that may be caused by the voltage variation of the gate line GL, the line to which the gate initialization signal GI is applied, or the data line DL disposed at the periphery of the first node N1 may be reduced. Similarly, since the second node N2 and the second capacitor CAP2 are connected to each other, the voltage fluctuation of the second node N2 that may be caused by the voltage variation of the gate line GL, the line to which the gate initialization signal GI is applied, or the data line DL disposed at the periphery of the second node N2 may be reduced.

In addition, when the inactivation period of the gate signal GW starts after the activation period of the gate signal GW ends, the voltage of each of the first and second nodes N1 and N2 may be increased, and as the voltages of the first node N1 and the second node N2 increase, a voltage of the gate terminal of the first transistor TR1 may also be increased. In this case, a flicker phenomenon in which a luminance of the organic light-emitting diode OLED is reduced may occur. In an embodiment, since the first node N1 and the first capacitor CAP1 are connected to each other, and the second node N2 and the second capacitor CAP2 are connected to each other, the voltage of each of the first and second nodes N1 and N2 may be reduced, so that the flicker phenomenon may be reduced.

The gate terminal of the eighth transistor (also referred to as a compensation transistor) TR8 may receive the compensation gate signal GN. In this case, the compensation gate signal GN may be provided from the compensation driver 130 (refer to FIGS. 1 and 2) through the compensation gate line GNL. The first terminal of the eighth transistor TR8 may receive the compensation voltage MINT. In this case, the compensation voltage MINT may be provided from the compensation driver 130 through the compensation voltage line MINTL. The second terminal of the eighth transistor TR8 may be simultaneously connected to a third node N3 between the second electrode of the first capacitor CAP1 and the first node N1, and a fourth node N4 between the fourth electrode of the second capacitor CAP2 and the second node N2.

The eighth transistor TR8 may provide the compensation voltage MINT to the third node N3 and the fourth node N4 during an activation period of the compensation gate signal GN. In other words, the compensation voltage MINT may be provided to the first node N1 and the second node N2. In this case, the eighth transistor TR8 may operate in a linear region. The activation period of the compensation gate signal GN may be substantially the same as the activation period of the emission signal EM. In other words, when the fifth and sixth transistors TR5 and TR6 are turned on, the eighth transistor TR8 may also be turned on. That is, a timing diagram of the compensation gate signal GN may be substantially the same as a timing diagram of the emission signal EM.

In an embodiment, a voltage level of the compensation voltage MINT may be variable according to a gray level. In an embodiment, leakage currents flowing through the first node N1 and the second node N2 may vary according to the gray level, for example. In this case, the leakage current flowing through the first node N1 will be defined as a first leakage current IoffT3, and the leakage current flowing through the second node N2 will be defined as a second leakage current IoffT4. When the pixel PX is driven with a relatively low gray level, a magnitude of the first leakage current IoffT3 may be smaller than a magnitude of the second leakage current IoffT4. The expression "the first leakage current IoffT3 is relatively small" means that a difference of a voltage across the first and second terminals of the third transistor TR3 (e.g., a first terminal of the first sub-transistor TR3_1 and a second terminal of the second sub-transistor TR3_2) is smaller than a difference of a voltage across the first and second terminals of the fourth transistor TR4 (e.g., a first terminal of the third sub-transistor TR4_1 and a second terminal of the fourth sub-transistor TR4_2). Similarly, when the pixel PX is driven with a relatively high gray level, the magnitude of the first leakage current IoffT3 may be greater than the magnitude of the second leakage current IoffT4. The expression "the first leakage current IoffT3 is relatively large" means that the difference of the voltage across the first and second terminals of the third transistor TR3 is larger than the difference of the voltage across the first and second terminals of the fourth transistor TR4. When a deviation between the first leakage current IoffT3 and the second leakage current IoffT4 is relatively large, the luminance of the organic light-emitting diode OLED may be reduced relatively more, so that the flicker phenomenon may be more severe.

In order to reduce the deviation between the first leakage current IoffT3 and the second leakage current IoffT4, a difference of a voltage across opposite ends of each of the third and fourth transistors TR3 and TR4 has to be reduced. In order to reduce the voltage difference, a voltage may be applied to the third and fourth nodes N3 and N4. In an embodiment, in a case where approximately −3 volts (V) is applied to the first terminal of the fourth transistor TR4, approximately 0 V is applied to a node between the fourth sub-transistor TR4_2 and the first sub-transistor TR3_1, and approximately 4 V is applied to the second terminal of the first transistor TR1, when approximately 3.5 V is applied to the third and fourth nodes N3 and N4, the difference of the voltage across the opposite ends of each of the third and fourth transistors TR3 and TR4 may be reduced, for example. However, since the voltage difference may vary according to a gray level, when a fixed voltage is applied to the third and fourth nodes N3 and N4, the deviation between the first leakage current IoffT3 and the second leakage current IoffT4 may be increased.

In an embodiment, as shown in FIG. 2, the compensation voltage MINT data corresponding to all gray levels may be stored in the memory 132. The calculator 131 may determine the compensation voltage MINT corresponding to the gray level data GD among the compensation voltage MINT data, and the signal generator 133 may generate the compensation gate signal GN and the compensation voltage MINT. The compensation driver 130 may provide the compensation gate signal GN and the compensation voltage MINT to the eighth transistor TR8. Accordingly, since the compensation voltage MINT corresponding to the gray level is provided to the third and fourth nodes N3 and N4 by the gray level data GD, the difference of the voltage across the opposite ends of each of the third and fourth transistors TR3 and TR4 may be reduced in all gray levels, and the deviation between the first leakage current IoffT3 and the second leakage current IoffT4 may also be reduced. In other words, in order to reduce the deviation between the first leakage current IoffT3 at the first node N1 and the second leakage current IoffT4 at the second node N2, the compensation voltage MINT data corresponding to all gray levels may be stored in the memory 132.

In addition, since the flicker phenomenon generally occurs in the low-frequency driving, the eighth transistor TR8 may be turned on by the compensation gate signal GN upon driving at a first frequency (i.e., a low frequency), and the eighth transistor TR8 may be turned off upon driving at a second frequency (i.e., a high frequency). In other embodiments, the eighth transistor TR8 may be turned on by the compensation gate signal GN at all frequencies regardless of the driving frequency.

However, although the pixel circuit PC according to the invention has been described as including one driving transistor, two dual gate transistors, two capacitors, and one storage capacitor, the configuration of the invention is not limited thereto. In an embodiment, the pixel circuit PC may have a configuration including at least one driving transistor, at least one dual gate transistor, at least one capacitor, and at least one storage capacitor, for example.

In addition, although the light-emitting element included in the pixel PX according to the invention has been described as including the organic light-emitting diode OLED, the configuration of the invention is not limited thereto. In an embodiment, the light-emitting element may include a quantum dot ("QD") light-emitting element, an inorganic light-emitting diode, or the like, for example.

Since the display device 100 in the embodiments of the invention includes the compensation driver 130 including the memory 132 which stores the compensation voltage MINT data corresponding to all gray levels, the calculator 131 which determines the compensation voltage MINT corresponding to the gray level data GD among the compensation voltage MINT data, and the signal generator 133 which generates the compensation gate signal GN and the compensation voltage MINT, the first and second capacitors CAP1 and CAP2, and the eighth transistor TR8 to which the compensation gate signal GN and the compensation voltage MINT are applied, the difference of the voltage across the opposite ends of each of the third and fourth transistors TR3 and TR4 may be reduced in all gray levels, and the deviation between the first leakage current IoffT3 and the second leakage current IoffT4 may also be reduced. Accordingly, the flicker phenomenon that may occur in the display device 100 may be significantly reduced.

Figure 4:
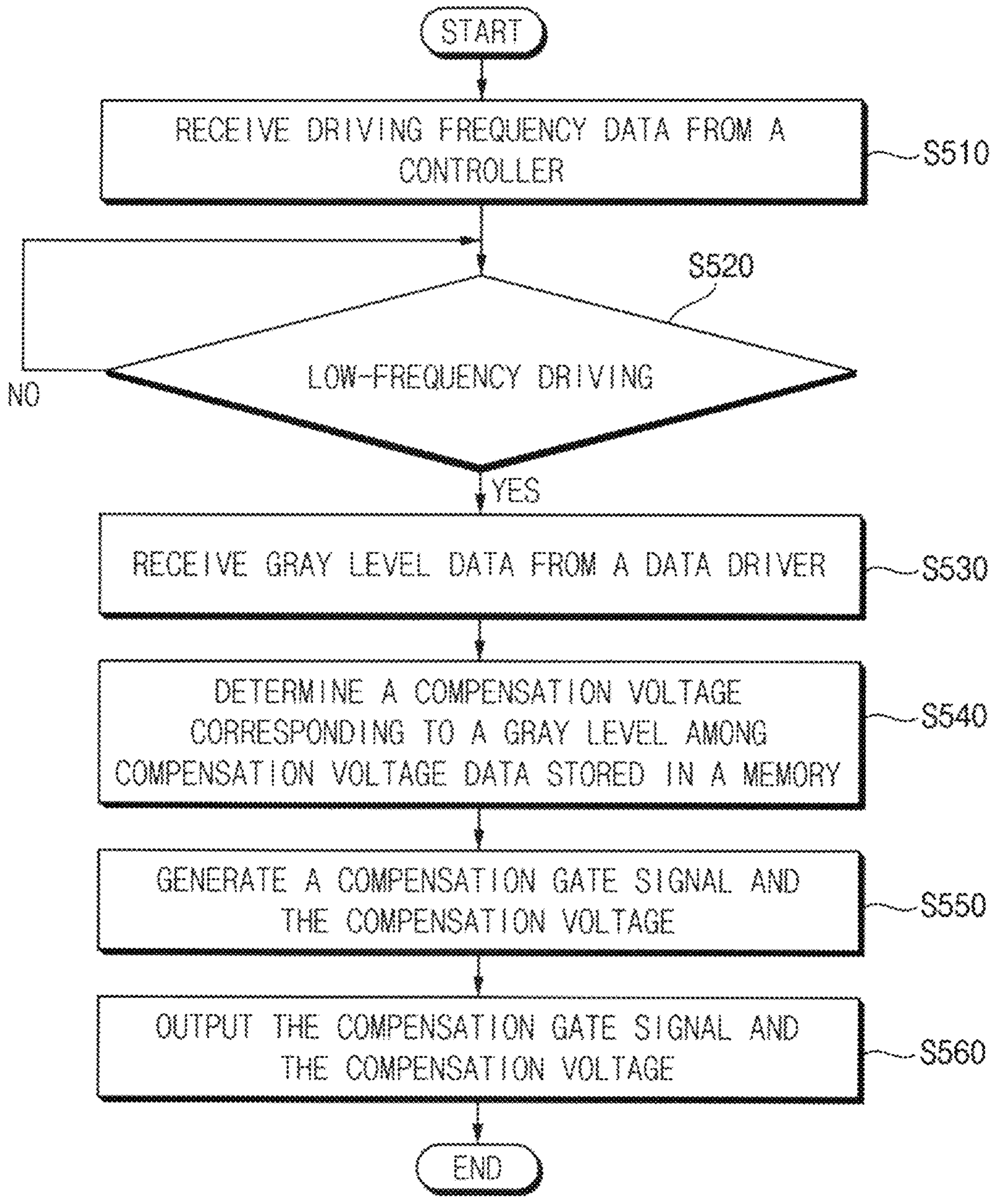
FIG. 4 is a flowchart for describing an embodiment of a method of driving a display device according to the invention.

FIG. 4 is a flowchart for describing an embodiment of a method of driving a display device according to the invention.

Referring to FIGS. 1, 2, 3, and 4, a method of driving a display device may include: receiving driving frequency data DFD from a controller 150 (S510), determining whether a driving frequency corresponds to first-frequency (e.g., low-frequency) driving or second-frequency (e.g., high-frequency) driving (S520), receiving gray level data GD from a data driver 120 (S530), determining a compensation voltage that is variable according to a gray level of the gray level data GD (or corresponds to the gray level) among compensation voltage data stored in a memory 132 to reduce a voltage across opposite ends of each of first and second dual gate transistors TR3 and TR4 (S540), generating a compensation gate signal GN and a compensation voltage MINT (S550), and providing the compensation gate signal GN and the compensation voltage MINT to a pixel PX (S560).

The compensation driver 130 may receive the driving frequency data DFD from the controller 150.

After the driving frequency data DFD is provided to a calculator 131, the calculator 131 may determine whether the driving frequency data DFD corresponds to the first-frequency driving or the second-frequency driving. In an embodiment, a first frequency may be a frequency that is greater than about 0 Hz and less than about 60 Hz, for example. In addition, a second frequency may be greater than or equal to about 60 Hz, and less than or equal to about 240 Hz. However, the above frequency range is one embodiment, and the first frequency and the second frequency according to the invention are not limited to the above frequency range.

When the calculator 131 determines that the driving frequency data DFD corresponds to the first-frequency driving, the gray level data GD may be provided to the calculator 131 from the data driver 120. On the contrary, when the calculator 131 determines that the driving frequency data DFD corresponds to the second-frequency driving, the gray level data GD may not be provided to the calculator 131 from the data driver 120, and the calculator 131 may not be driven.

When the gray level data GD is provided to the calculator 131, the calculator 131 may determine the compensation voltage MINT corresponding to the gray level data GD among the compensation voltage MINT data stored in the memory 132 to reduce the voltage across the opposite ends of each of first and second dual gate transistors TR3 and TR4. In an embodiment, the compensation voltage MINT data corresponding to all gray levels (e.g., 0 to 255 gray levels) may be stored in the memory 132, for example.

The signal generator 133 may generate the compensation voltage MINT based on the compensation voltage MINT corresponding to the gray level data GD, and the signal generator 133 may further generate the compensation gate signal GN.

The compensation driver 130 may output the compensation gate signal GN and the compensation voltage MINT to pixels PX connected to compensation gate lines GNL and compensation voltage lines MINTL based on the compensation control signal CTLC.

In other words, since a flicker phenomenon generally occurs in the low-frequency driving, an eighth transistor TR8 may be turned on by the compensation gate signal GN upon the driving at the first frequency (i.e., a low frequency), and the eighth transistor TR8 may be turned off upon the driving at the second frequency (i.e., a high frequency).

The method of driving the display device in embodiments of the invention may be performed only in the low-frequency driving, a difference of a voltage across opposite ends of each of third and fourth transistors TR3 and TR4 may be reduced in all gray levels, and a deviation between a first leakage current IoffT3 and a second leakage current IoffT4 may also be reduced. Accordingly, the flicker phenomenon that may occur in the display device may be significantly reduced.

Figure 5:
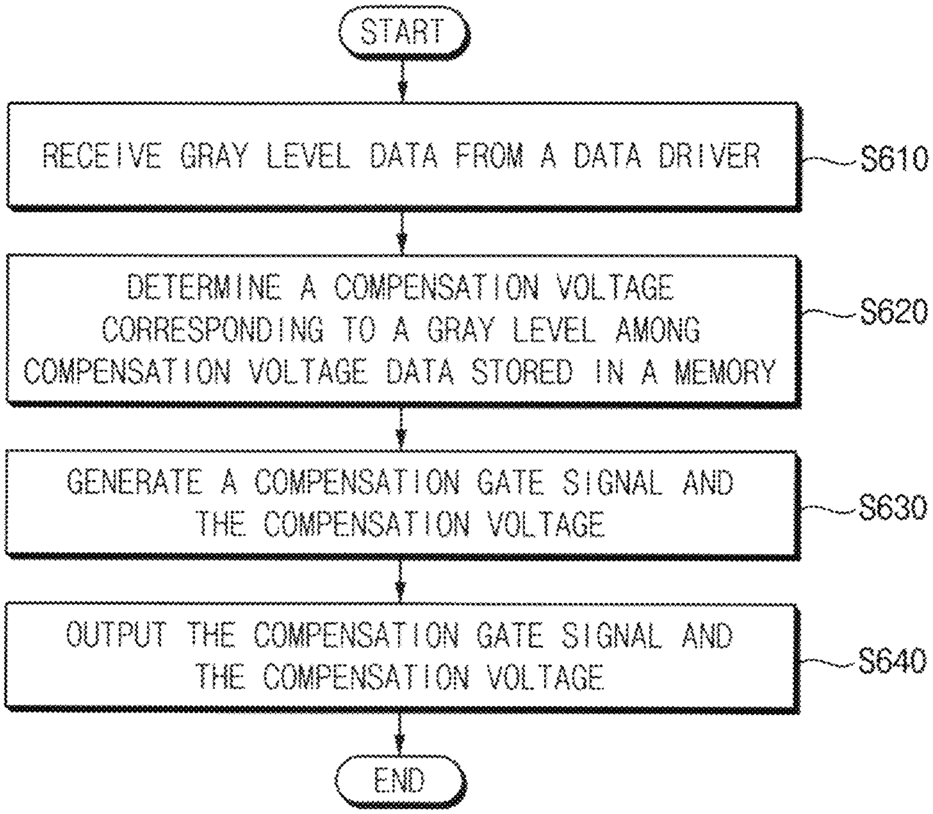
FIG. 5 is a flowchart for describing an embodiment of a method of driving a display device according to the invention.

FIG. 5 is a flowchart for describing an embodiment of a method of driving a display device according to the invention.

Referring to FIGS. 1, 2, 3, and 5, a method of driving a display device may include: receiving gray level data GD from a data driver 120 (S610), determining a compensation voltage that is variable according to a gray level of the gray level data GD (or corresponds to the gray level) among compensation voltage data stored in a memory 132 to reduce a voltage across opposite ends of each of first and second dual gate transistors TR3 and TR4 (S620), generating a compensation gate signal GN and a compensation voltage MINT (S630), and providing the compensation gate signal GN and the compensation voltage MINT to a pixel PX (S640).

The gray level data GD may be provided to the calculator 131 from the data driver 120. When the gray level data GD is provided to the calculator 131, the calculator 131 may determine the compensation voltage MINT corresponding to the gray level data GD among the compensation voltage MINT data stored in the memory 132 to reduce the voltage across the opposite ends of each of the first and second dual gate transistors TR3 and TR4. In an embodiment, the compensation voltage MINT data corresponding to all gray levels (e.g., 0 to 255 gray levels) may be stored in the memory 132, for example.

The signal generator 133 may generate the compensation voltage MINT based on the compensation voltage MINT corresponding to the gray level data GD, and the signal generator 133 may generate the compensation gate signal GN.

The compensation driver 130 may output the compensation gate signal GN and the compensation voltage MINT to pixels PX connected to compensation gate lines GNL and compensation voltage lines MINTL based on the compensation control signal CTLC.

In other words, an eighth transistor TR8 may be turned on by the compensation gate signal GN at all frequencies regardless of a driving frequency.

Figure 6:
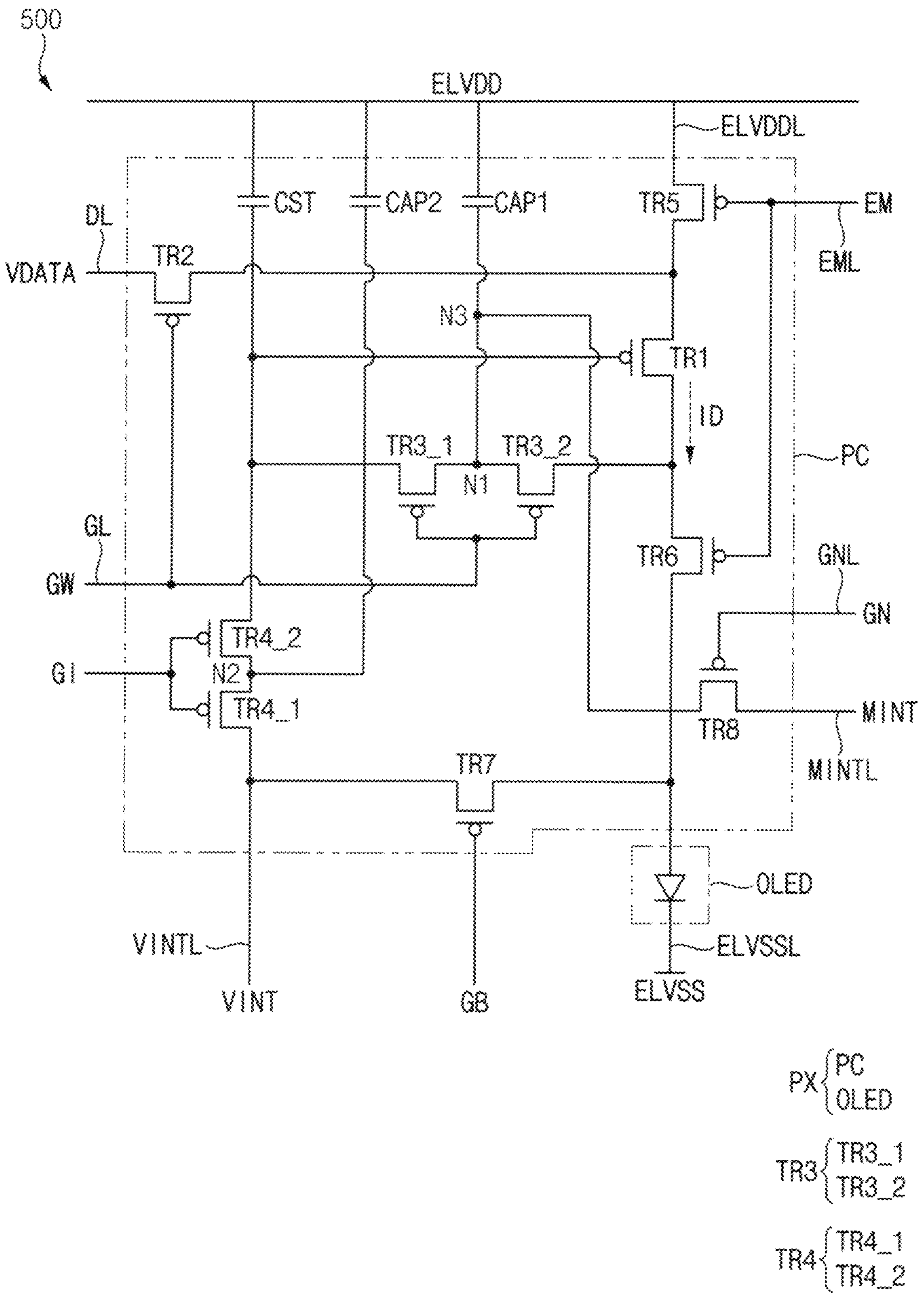
FIG. 6 is a circuit diagram showing an embodiment of a pixel according to the invention.
Figure 7:
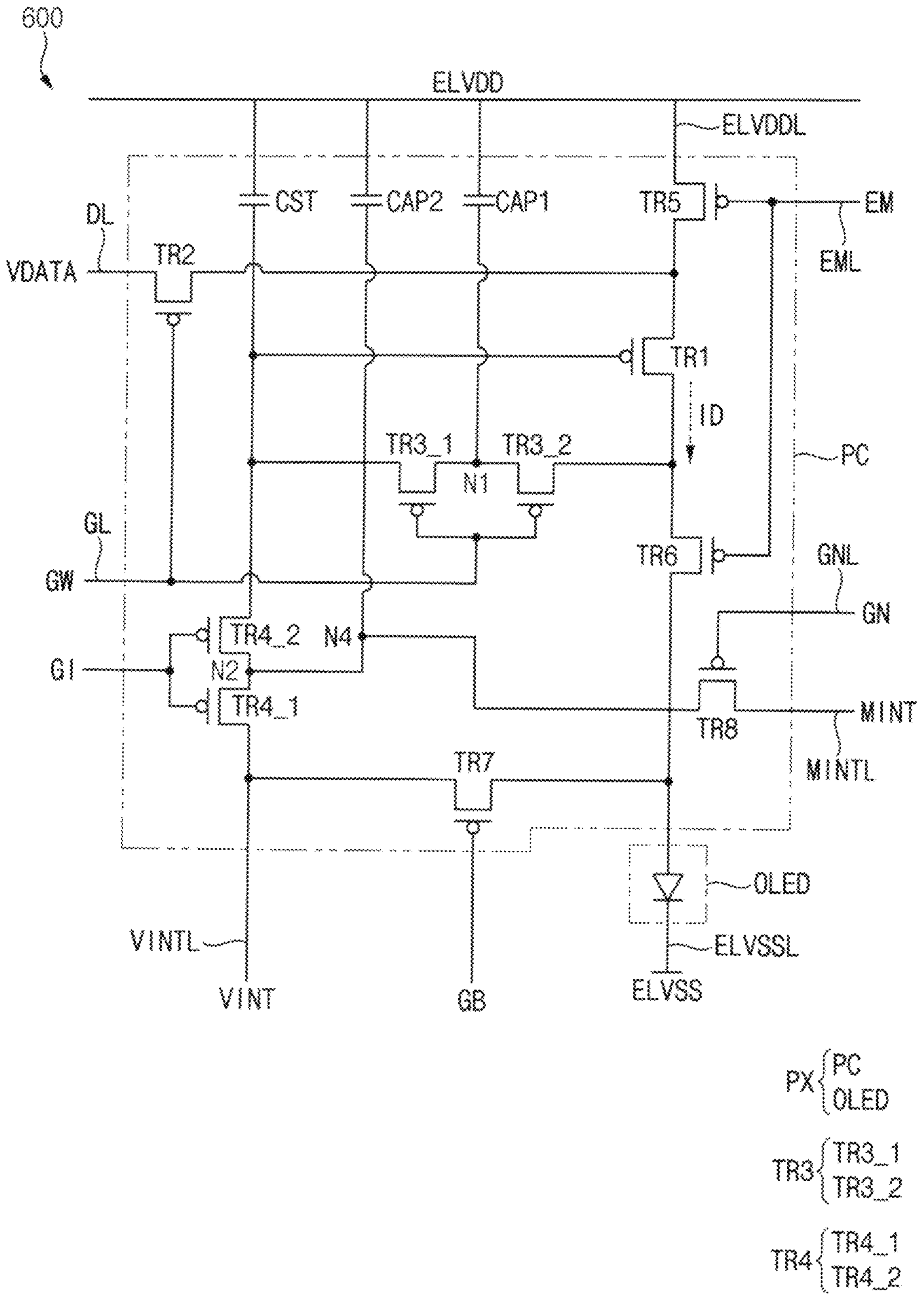
FIG. 7 is a circuit diagram showing an embodiment of a pixel according to the invention.

FIG. 6 is a circuit diagram showing an embodiment of a pixel according to the invention, and FIG. 7 is a circuit diagram showing an embodiment of a pixel according to the invention. Display devices 500 and 600 illustrated in FIGS. 6 and 7 may have configurations that are substantially identical or similar to the configuration of the display device 100 described with reference to FIGS. 1 to 3 except for the configuration of the eighth transistor TR8. In FIGS. 6 and 7, redundant descriptions of components that are substantially identical or similar to the components described with reference to FIGS. 1 to 3 will be omitted.

Referring to FIGS. 1, 2, and 6, the display device 500 may include a pixel PX, and the pixel PX may include a pixel circuit PC and an organic light-emitting diode OLED. In this case, the pixel circuit PC may include first to eighth transistors TR1, TR2, TR3, TR4, TR5, TR6, TR7, and TR8, a storage capacitor CST, a first capacitor CAP1, a second capacitor CAP2, or the like. In addition, the pixel circuit PC or the organic light-emitting diode OLED may be connected to the first power supply voltage line ELVDDL, the second power supply voltage line ELVSSL, the initialization voltage line VINTL, the data line DL, the gate line GL, the emission line EML, the compensation gate lines GNL, the compensation voltage lines MINTL, or the like. The first transistor TR1 may correspond to a driving transistor, and the second to eighth transistors TR2, TR3, TR4, TR5, TR6, TR7, and TR8 may correspond to switching transistors. Each of the first to eighth transistors TR1, TR2, TR3, TR4, TR5, TR6, TR7, and TR8 may include a first terminal, a second terminal, and a gate terminal. In an embodiment, the first terminal may be a source terminal, and the second terminal may be a drain terminal. In some embodiments, the first terminal may be a drain terminal, and the second terminal may be a source terminal.

The gate terminal of the eighth transistor TR8 may receive the compensation gate signal GN. In this case, the compensation gate signal GN may be provided from the compensation driver 130 through the compensation gate line GNL. The first terminal of the eighth transistor TR8 may receive the compensation voltage MINT. In this case, the compensation voltage MINT may be provided from the compensation driver 130 through the compensation voltage line MINTL. The second terminal of the eighth transistor TR8 may be connected only to a third node N3 between the second electrode of the first capacitor CAP1 and the first node N1. In other words, when compared with the display device 100 of FIG. 3, the second terminal of the eighth transistor TR8 may not be connected to a fourth node N4 between the fourth electrode of the second capacitor CAP2 and the second node N2.

The eighth transistor TR8 may provide the compensation voltage MINT to the third node N3 during an activation period of the compensation gate signal GN. In other words, the compensation voltage MINT may be provided to the first node N1.

In an embodiment, a voltage level of the compensation voltage MINT may be variable according to a gray level. In an embodiment, a leakage current flowing through the first node N1 may vary according to the gray level, for example. In this case, the leakage current flowing through the first node N1 will be defined as a first leakage current IoffT3. In order to reduce the first leakage current IoffT3, a difference of a voltage across opposite ends of the third transistor TR3 has to be reduced. In order to reduce the voltage difference, the compensation voltage MINT may be applied to the third node N3.

On the contrary, as shown in FIG. 7, according to the display device 600, the second terminal of the eighth transistor TR8 may be connected only to a fourth node N4 between the fourth electrode of the second capacitor CAP2 and the second node N2. In other words, when compared with the display device 100 of FIG. 3, the second terminal of the eighth transistor TR8 may not be connected to a third node N3 between the second electrode of the first capacitor CAP1 and the first node N1.

The eighth transistor TR8 may provide the compensation voltage MINT to the fourth node N4 during an activation period of the compensation gate signal GN. In other words, the compensation voltage MINT may be provided to the second node N2.

In an embodiment, a voltage level of the compensation voltage MINT may be variable according to a gray level. In an embodiment, a leakage current flowing through the second node N2 may vary according to the gray level, for example. In this case, the leakage current flowing through the second node N2 will be defined as a second leakage current IoffT4. In order to reduce the second leakage current IoffT4, a difference of a voltage across opposite ends of the fourth transistor TR4 has to be reduced. In order to reduce the voltage difference, the compensation voltage MINT may be applied to the fourth node N4.

Figure 8:
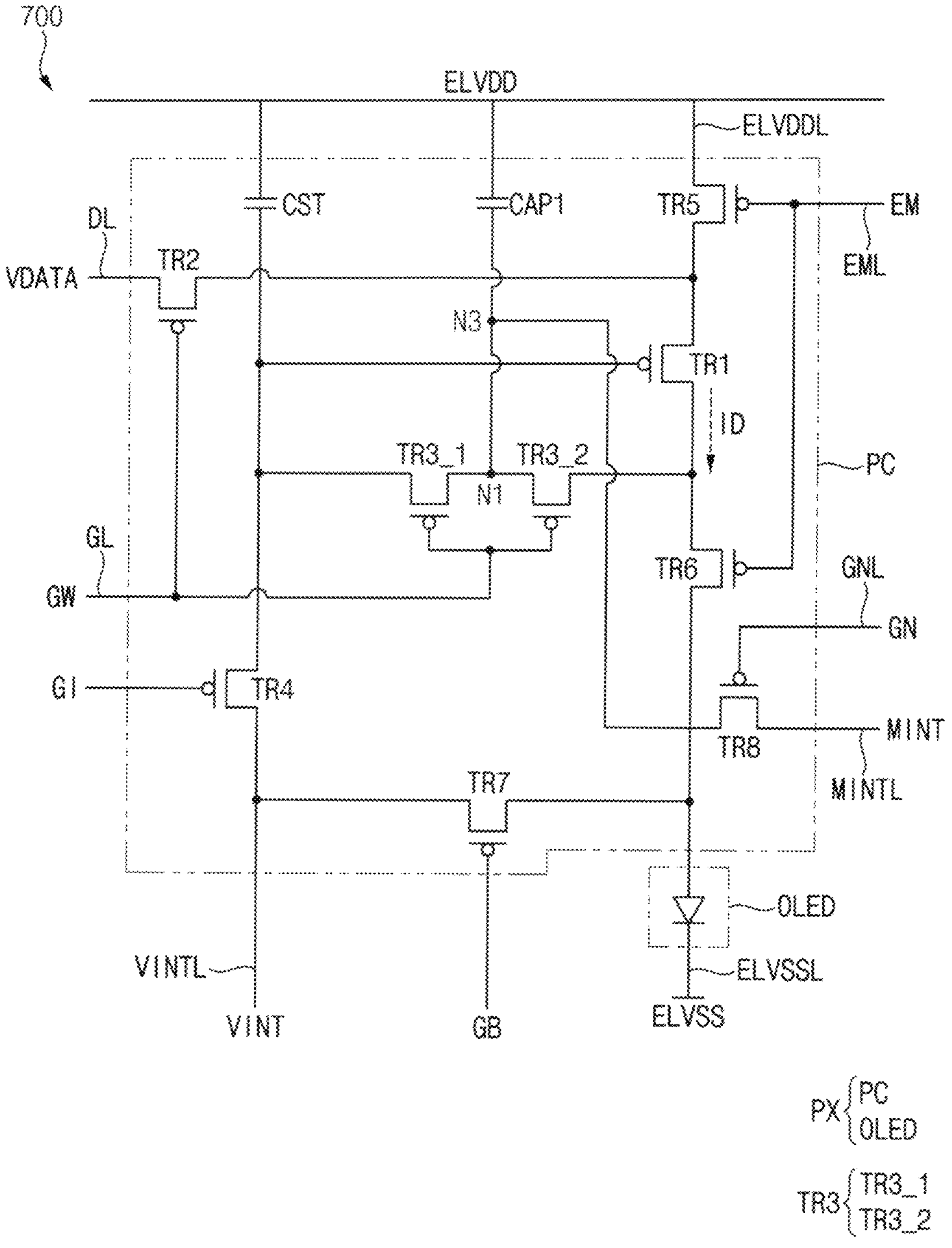
FIG. 8 is a circuit diagram showing an embodiment of a pixel according to the invention.

FIG. 8 is a circuit diagram showing an embodiment of a pixel according to the invention. A display device 700 illustrated in FIG. 8 may have a configuration that is substantially identical or similar to the configuration of the display device 100 described with reference to FIGS. 1 to 3 except for the configuration of the fourth transistor TR4 and the configuration of the eighth transistor TR8. In FIG. 8, redundant descriptions of components that are substantially identical or similar to the components described with reference to FIGS. 1 to 3 will be omitted.

Referring to FIGS. 1, 2, and 8, the display device 700 may include a pixel PX, and the pixel PX may include a pixel circuit PC and an organic light-emitting diode OLED. In this case, the pixel circuit PC may include first to eighth transistors TR1, TR2, TR3, TR4, TR5, TR6, TR7, and TR8, a storage capacitor CST, a first capacitor CAP1, or the like. In this case, only the third transistor TR3 may function as a dual gate transistor.

The second terminal of the eighth transistor TR8 may be connected only to a third node N3 between the second electrode of the first capacitor CAP1 and the first node N1.

Figure 9:
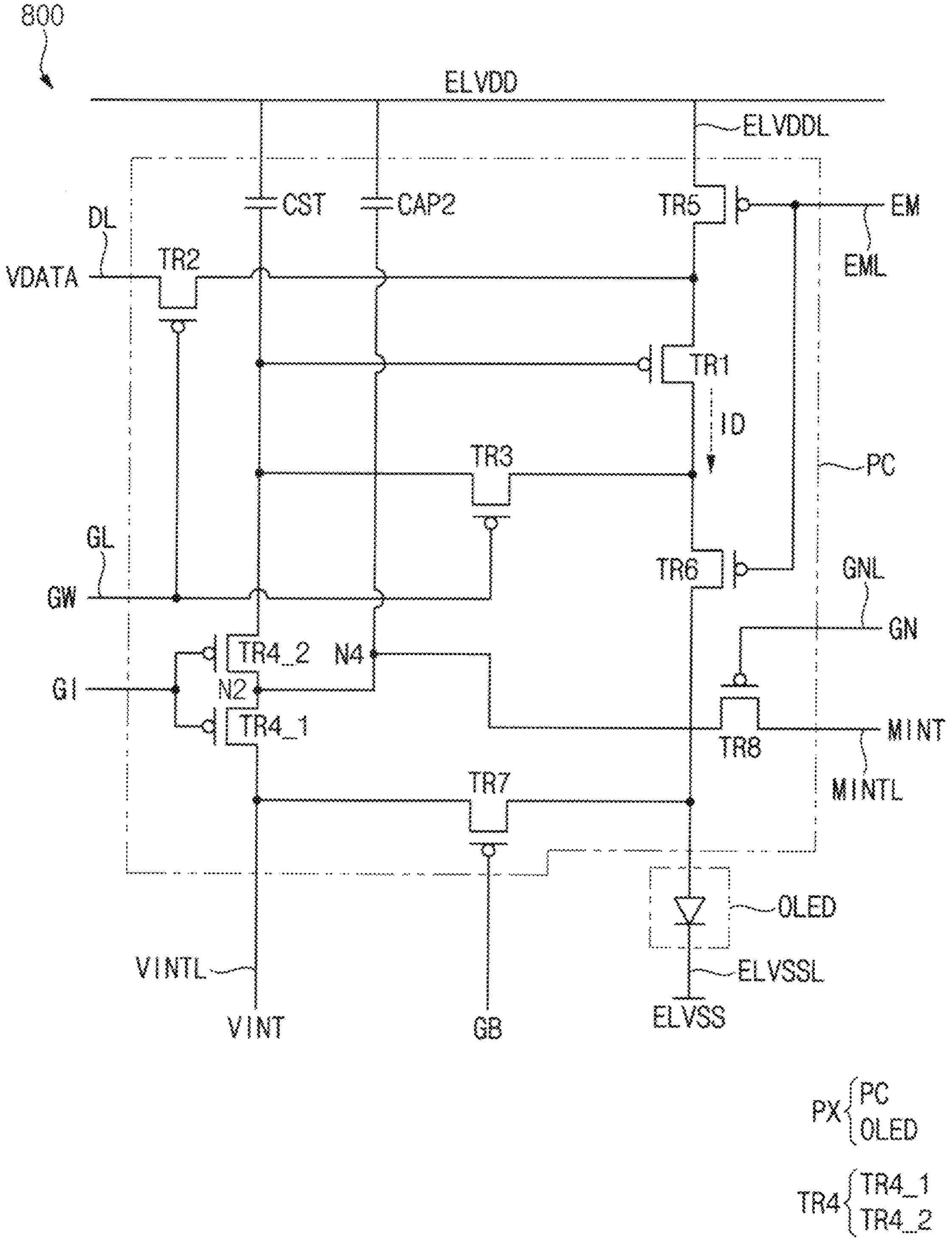
FIG. 9 is a circuit diagram showing an embodiment of a pixel according to the invention.

FIG. 9 is a circuit diagram showing an embodiment of a pixel according to the invention. A display device 800 illustrated in FIG. 9 may have a configuration that is substantially identical or similar to the configuration of the display device 100 described with reference to FIGS. 1 to 3 except for the configuration of the third transistor TR3 and the configuration of the eighth transistor TR8. In FIG. 9, redundant descriptions of components that are substantially identical or similar to the components described with reference to FIGS. 1 to 3 will be omitted.

Referring to FIGS. 1, 2, and 9, the display device 800 may include a pixel PX, and the pixel PX may include a pixel circuit PC and an organic light-emitting diode OLED. In this case, the pixel circuit PC may include first to eighth transistors TR1, TR2, TR3, TR4, TR5, TR6, TR7, and TR8, a storage capacitor CST, a second capacitor CAP2, or the like. In this case, only the fourth transistor TR4 may function as a dual gate transistor.

The second terminal of the eighth transistor TR8 may be connected only to a fourth node N4 between the fourth electrode of the second capacitor CAP2 and the second node N2.

Figure 10:
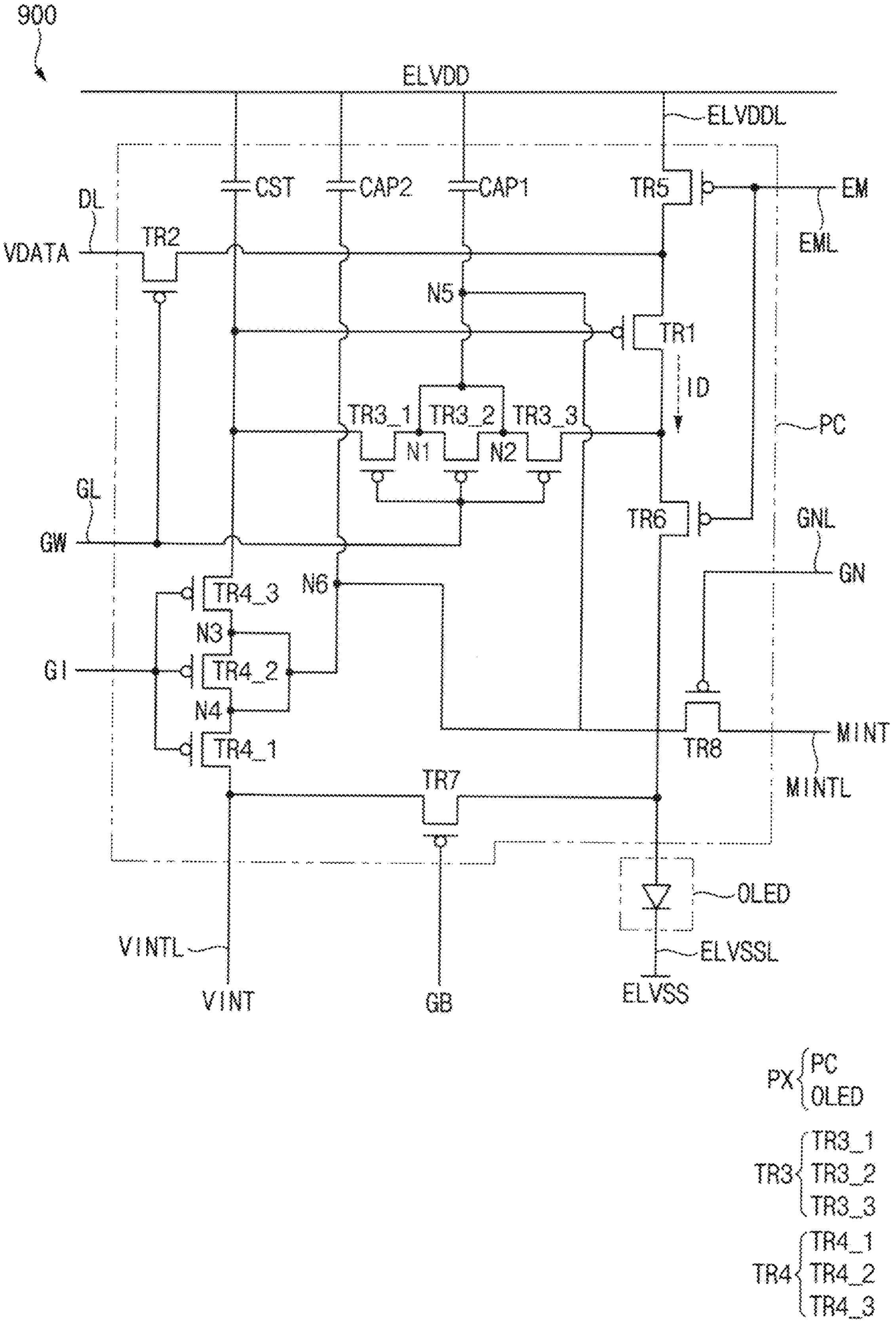
FIG. 10 is a circuit diagram showing an embodiment of a pixel according to the invention.

FIG. 10 is a circuit diagram showing an embodiment of a pixel according to the invention. A display device 900 illustrated in FIG. 9 may have a configuration that is substantially identical or similar to the configuration of the display device 100 described with reference to FIGS. 1 to 3 except for the configuration of the third transistor TR3 and the configuration of the fourth transistor TR4. In FIG. 10, redundant descriptions of components that are substantially identical or similar to the components described with reference to FIGS. 1 to 3 will be omitted.

Referring to FIGS. 1, 2, and 10, the display device 900 may include a pixel PX, and the pixel PX may include a pixel circuit PC and an organic light-emitting diode OLED. In this case, the pixel circuit PC may include first to eighth transistors TR1, TR2, TR3, TR4, TR5, TR6, TR7, and TR8, a storage capacitor CST, a first capacitor CAP1, a second capacitor CAP2, or the like. In addition, the pixel circuit PC or the organic light-emitting diode OLED may be connected to the first power supply voltage line ELVDDL, the second power supply voltage line ELVSSL, the initialization voltage line VINTL, the data line DL, the gate line GL, the emission line EML, the compensation gate lines GNL, the compensation voltage lines MINTL, or the like. The first transistor TR1 may correspond to a driving transistor, and the second to eighth transistors TR2, TR3, TR4, TR5, TR6, TR7, and TR8 may correspond to switching transistors. Each of the first to eighth transistors TR1, TR2, TR3, TR4, TR5, TR6, TR7, and TR8 may include a first terminal, a second terminal, and a gate terminal. In an embodiment, the first terminal may be a source terminal, and the second terminal may be a drain terminal. In some embodiments, the first terminal may be a drain terminal, and the second terminal may be a source terminal.

The gate terminal of the third transistor TR3 may receive the gate signal GW. The first terminal of the third transistor TR3 may be connected to the gate terminal of the first transistor TR1. The second terminal of the third transistor TR3 may be connected to the second terminal of the first transistor TR1. In other words, the third transistor TR3 may be connected between the gate terminal of the first transistor TR1 and the second terminal of the first transistor TR1.

In an embodiment, the third transistor TR3 may be defined as a first triple gate transistor. The first triple gate transistor may include a first sub-transistor TR3_1, a second sub-transistor TR3_2, and a third sub-transistor TR3_3. The first sub-transistor TR3_1, the second sub-transistor TR3_2, and the third sub-transistor TR3_3 may be connected in series, and a first node N1 and a second node N2 may connect the first sub-transistor TR3_1, the second sub-transistor TR3_2, and the third sub-transistor TR3_3 to each other. In other words, the third transistor TR3 may operate as a triple gate transistor, and the same signal may be applied to a gate terminal of each of the first, second, and third sub-transistors TR3_1, TR3_2, and TR3_3. That is, the gate electrode of each of the first, second, and third sub-transistors TR3_1, TR3_2, and TR3_3 may receive the gate signal GW. In addition, a second terminal of the first sub-transistor TR3_1 and a first terminal of the second sub-transistor TR3_2 may be connected to each other, and a second terminal of the second sub-transistor TR3_2 and a first terminal of the third sub-transistor TR3_3 may be connected to each other.

The gate terminal of the fourth transistor TR4 may receive the gate initialization signal GI. The first terminal of the fourth transistor TR4 may receive the initialization voltage VINT. The second terminal of the fourth transistor TR4 may be connected to the gate terminal of the first transistor TR1. In other words, the fourth transistor TR4 may be connected between the first sub-transistor TR3_1 and the initialization voltage line VINTL.

In an embodiment, the fourth transistor TR4 may be defined as a second triple gate transistor. The second triple gate transistor may include a fourth sub-transistor TR4_1, a fifth sub-transistor TR4_2, and a sixth sub-transistor TR4_3. The fourth sub-transistor TR4_1, the fifth sub-transistor TR4_2, and the sixth sub-transistor TR4_3 may be connected in series, and a third node N3 and a fourth node N4 may connect the fourth sub-transistor TR4_1, the fifth sub-transistor TR4_2, and the sixth sub-transistor TR4_3 to each other. In other words, the fourth transistor TR4 may operate as a triple gate transistor, and the same signal may be applied to a gate terminal of each of the fourth, fifth, and sixth sub-transistors TR4_1, TR4_2, and TR4_3. That is, the gate terminal of each of the fourth, fifth, and sixth sub-transistors TR4_1, TR4_2, and TR4_3 may receive the gate initialization signal GI. In addition, a second terminal of the fourth sub-transistor TR4_1 and a first terminal of the fifth sub-transistor TR4_2 may be connected to each other, and a second terminal of the fifth sub-transistor TR4_2 and a first terminal of the sixth sub-transistor TR4_3 may be connected to each other.

The gate terminal of the eighth transistor TR8 may receive the compensation gate signal GN. In this case, the compensation gate signal GN may be provided from the compensation driver 130 through the compensation gate line GNL. The first terminal of the eighth transistor TR8 may receive the compensation voltage MINT. In this case, the compensation voltage MINT may be provided from the compensation driver 130 through the compensation voltage line MINTL. The second terminal of the eighth transistor TR8 may be simultaneously connected to a fifth node N5 between the second electrode of the first capacitor CAP1 and a node to which the first and second nodes N1 and N2 are connected, and a sixth node N6 between the fourth electrode of the second capacitor CAP2 and a node to which the third and fourth nodes N3 and N4 are connected.

Figure 11:
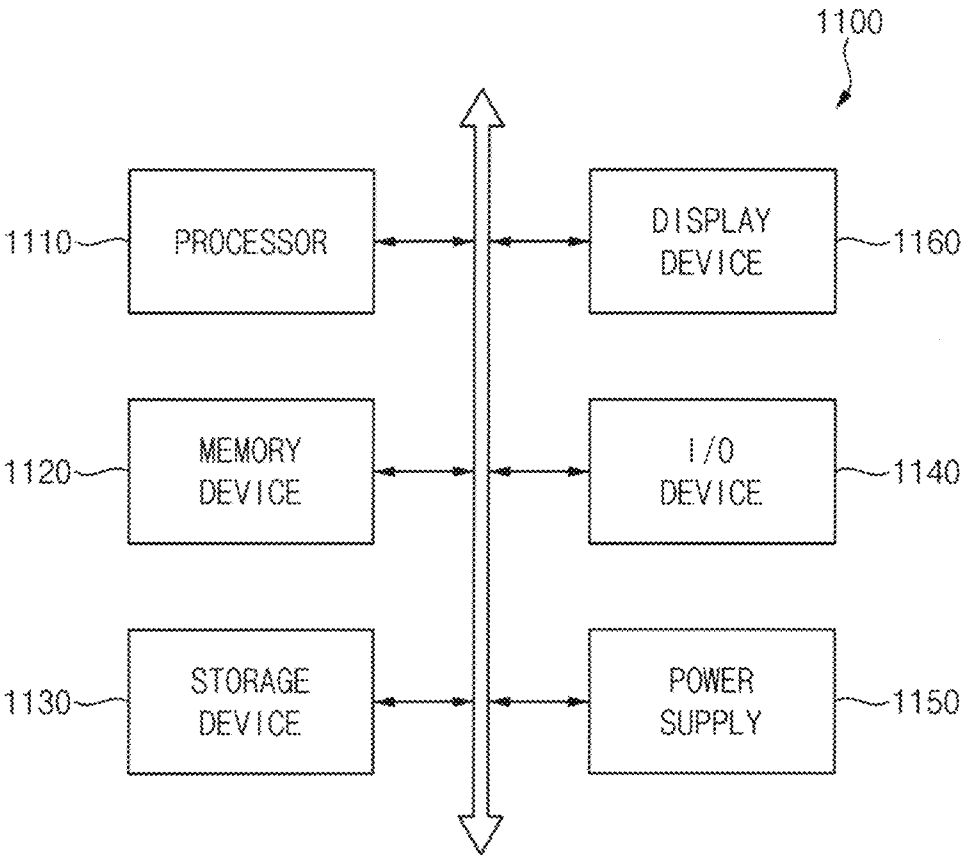
FIG. 11 is a block diagram illustrating an electronic device including a display device according to the invention.

FIG. 11 is a block diagram illustrating an electronic device including a display device according to the invention.

Referring to FIG. 11, an electronic device 1100 may include a processor 1110, a memory device 1120, a storage device 1130, an input/output ("I/O") device 1140, a power supply 1150, and a display device 1160. The electronic device 1100 may further include a plurality of ports for communicating with a video card, a sound card, a memory card, a universal serial bus ("USB") device, other electric devices, etc.

The processor 1110 may perform various computing functions or tasks. The processor 1110 may be an application processor ("AP"), a microprocessor, a central processing unit ("CPU"), etc. The processor 1110 may be coupled to other components via an address bus, a control bus, a data bus, etc. Further, in embodiments, the processor 1110 may be further coupled to an extended bus such as a peripheral component interconnection ("PCI") bus.

The memory device 1120 may store data for operations of the electronic device 1100. In an embodiment, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile dynamic random access memory ("mobile DRAM") device, etc., for example.

The storage device 1130 may be a solid state drive ("SSD") device, a hard disk drive ("HDD") device, a compact disc read-only memory ("CD-ROM") device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links. In an embodiment, the display device 1160 may be an organic light-emitting display device including the pixel including the organic light-emitting diode OLED described above.

The display device 1160 may include a display panel including a plurality of pixels, a controller, a data driver, a gate driver, an emission driver, a power supply unit, a gamma reference voltage generator, a compensation driver or the like. In this case, the compensation driver may include a calculator, a memory, and a signal generator. In addition, each of the pixels may include a pixel circuit and an organic light-emitting diode, and the pixel circuit may include first to eighth transistors, a storage capacitor, a first capacitor, a second capacitor, or the like. Further, the first transistor may correspond to a driving transistor, and each of the third and fourth transistors may operate as a dual gate transistor. In an embodiment, the compensation voltage data corresponding to all gray levels may be stored in the memory. The calculator may determine the compensation voltage corresponding to the gray level data among the compensation voltage data, and the signal generator may generate the compensation gate signal and the compensation voltage. The compensation driver may provide the compensation gate signal and the compensation voltage to the eighth transistor. Accordingly, the difference of the voltage across the opposite ends of each of the third and fourth transistors may be reduced in all gray levels, and the deviation between the first leakage current and the second leakage current may also be reduced. That is, a flicker phenomenon that may occur in the display device 1160 may be significantly reduced.

Embodiments of the invention may be applied to any light-emitting display device 1160 supporting the variable frame mode, and any electronic device 1100 including the light-emitting display device 1160. Embodiments of the invention may be applied to a smart phone, a wearable electronic device, a tablet computer, a mobile phone, a television ("TV"), a digital TV, a three-dimensional ("3D") TV, a personal computer, a home appliance, a laptop computer, a personal digital assistant ("PDA"), a portable multimedia player ("PMP"), a digital camera, a music player, a portable game console, a navigation device, etc., for example.

Embodiments of the invention may be applied to various electronic devices including a display device. Embodiments of the invention may be applied to numerous electronic devices such as vehicle-display devices, ship-display devices, aircraft-display devices, portable communication devices, exhibition display devices, information transfer display devices, medical-display devices, etc., for example.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of various embodiments and is not to be construed as limited to the embodiments disclosed, and that modifications to the disclosed embodiments, as well as other embodiments, are intended to be included within the scope of the appended claims.

What is claimed is:

1. A pixel comprising:

an organic light-emitting diode including a first terminal electrically connected to an output node and a second terminal electrically connected to a second power supply voltage line;

a driving transistor including a first terminal electrically connected to an input node, a second terminal electrically connected to the output node, and a gate terminal electrically connected to a control node;

a first dual gate transistor electrically connected between the control node and the second terminal of the driving transistor, the first dual gate transistor including a first sub-transistor and a second sub-transistor which are connected in series;

a first capacitor including a first electrode electrically connected to a first power supply voltage line and a second electrode electrically connected to a first node which connects the first and second sub-transistors to each other; and a compensation transistor including a first terminal to which a compensation voltage is applied, a second terminal electrically connected to the first node, and a gate terminal to which a compensation gate signal is applied.

2. The pixel of claim 1, wherein a voltage level of the compensation voltage is variable according to a gray level, and wherein the compensation voltage is provided to the first node when the compensation transistor is turned on.

3. The pixel of claim 1, further comprising:

a second dual gate transistor electrically connected between the control node and an initialization voltage line, the second dual gate transistor including a third sub-transistor and a fourth sub-transistor which are connected in series.

4. The pixel of claim 3, further comprising:

a second capacitor including a third electrode electrically connected to the first power supply voltage line and a fourth electrode electrically connected to a second node which connects the third and fourth sub-transistors to each other.

5. The pixel of claim 4, wherein the second terminal of the compensation transistor is electrically connected to the second node, wherein a voltage level of the compensation voltage is variable according to a gray level, and wherein the compensation voltage is provided to the first and second nodes when the compensation transistor is turned on.

6. The pixel of claim 5, wherein, when the pixel is driven at a first frequency, the compensation transistor is turned on in response to the compensation gate signal, such that a deviation between a leakage current at the first node and a leakage current at the second node is reduced by the compensation voltage.

7. The pixel of claim 6, wherein, when the pixel is driven at a second frequency different from the first frequency, the compensation transistor is turned off in response to the compensation gate signal.

8. The pixel of claim 7, wherein the first frequency is greater than about 0 hertz and less than about 60 hertz, and wherein the second frequency is greater than or equal to about 60 hertz and less than or equal to about 240 hertz.

9. The pixel of claim 1, wherein the first dual gate transistor diode-connects the driving transistor in response to a gate signal.

10. The pixel of claim 1, further comprising:

a storage capacitor including a first terminal electrically connected to the first power supply voltage line and a second terminal electrically connected to the control node; and a first switching transistor including a first terminal electrically connected to the input node, a second terminal electrically connected to a data line, and a gate terminal to which a gate signal is applied.

11. The pixel of claim 1, further comprising:

a second switching transistor including a first terminal electrically connected to the first power supply voltage line, a second terminal electrically connected to the input node, and a gate terminal to which an emission signal is applied; and a third switching transistor including a first terminal electrically connected to the second terminal of the driving transistor, a second terminal electrically connected to the output node, and a gate terminal to which the emission signal is applied.

12. The pixel of claim 1, further comprising:

a fourth switching transistor including a first terminal electrically connected to an initialization voltage line, a second terminal electrically connected to the output node, and a gate electrode to which an anode initialization signal is applied.

13. A display device comprising:

a display panel including pixels, each of the pixels including:

an organic light-emitting diode including a first terminal electrically connected to an output node and a second terminal electrically connected to a second power supply voltage line;

a driving transistor including a first terminal electrically connected to an input node, a second terminal electrically connected to the output node, and a gate terminal electrically connected to a control node;

a first dual gate transistor electrically connected between the control node and the second terminal of the driving transistor, the first dual gate transistor including a first sub-transistor and a second sub-transistor which are connected in series;

a first capacitor including a first electrode electrically connected to a first power supply voltage line and a second electrode electrically connected to a first node which connects the first and second sub-transistors to each other; and a compensation transistor including a first terminal to which a compensation voltage is applied, a second terminal electrically connected to the first node, and a gate terminal to which a compensation gate signal is applied;

a data driver which generates a data voltage corresponding to input image data and supplies the data voltage to the pixels; and a compensation driver which receives gray level data from the data driver and generates the compensation voltage.

14. The display device of claim 13, wherein a voltage level of the compensation voltage is variable according to a gray level, and wherein the compensation voltage is provided to the first node when the compensation transistor is turned on.

15. The display device of claim 13, wherein each of the pixels further includes:

a second dual gate transistor electrically connected between the control node and an initialization voltage line, the second dual gate transistor including a third sub-transistor and a fourth sub-transistor which are connected in series; and a second capacitor including a third electrode electrically connected to the first power supply voltage line and a fourth electrode electrically connected to a second node which connects the third and fourth sub-transistors to each other.

16. The display device of claim 15, wherein the second terminal of the compensation transistor is electrically connected to the second node, wherein a voltage level of the compensation voltage is variable according to a gray level, and wherein the compensation voltage is provided to the first and second nodes when the compensation transistor is turned on.

17. The display device of claim 16, wherein the compensation driver provides the compensation gate signal and the compensation voltage to the compensation transistor when the pixel is driven at a first frequency.

18. The display device of claim 17, wherein the compensation driver includes:

a memory which stores compensation voltage data for reducing a deviation between a leakage current at the first node and a leakage current at the second node according to a gray level;

a calculator which receives the gray level data and determines the compensation voltage corresponding to the gray level among the compensation voltage data; and a signal generator which generates the compensation voltage and the compensation gate signal.

19. The display device of claim 13, wherein each of the pixels further includes:

a storage capacitor including a first terminal electrically connected to the first power supply voltage line and a second terminal electrically connected to the control node;

a first switching transistor including a first terminal electrically connected to the input node, a second terminal electrically connected to a data line, and a gate terminal to which a gate signal is applied;

a second switching transistor including a first terminal electrically connected to the first power supply voltage line, a second terminal electrically connected to the input node, and a gate terminal to which an emission signal is applied;

a third switching transistor including a first terminal electrically connected to the second terminal of the driving transistor, a second terminal electrically connected to the output node, and a gate terminal to which the emission signal is applied; and a fourth switching transistor including a first terminal electrically connected to an initialization voltage line, a second terminal electrically connected to the output node, and a gate electrode to which an anode initialization signal is applied.

20. The display device of claim 13, further comprising:

a gate driver which generates a gate signal to supply the gate signal to the pixels;

an emission driver which generates an emission signal to supply the emission signal to the pixels;

a power supply unit which generates a first power supply voltage, an initialization voltage, and a second power supply voltage to provide the first power supply voltage, the initialization voltage, and the second power supply voltage to the pixels; and a controller which generates the input image data to provide the input image data to the data driver.

* * * * *